(12) United States Patent
Hilla

(10) Patent No.: US 9,647,838 B2
(45) Date of Patent: May 9, 2017

(54) RESTRUCTURING THE COMPUTER AND ITS ASSOCIATION WITH THE INTERNET

(71) Applicant: Ralph John Hilla, Burnsville, MN (US)

(72) Inventor: Ralph John Hilla, Burnsville, MN (US)

(*) Notice: Subject to any disclaimer, the term of this patent is extended or adjusted under 35 U.S.C. 154(b) by 264 days.

(21) Appl. No.: 13/999,151

(22) Filed: Jan. 21, 2014

(65) Prior Publication Data
US 2015/0207628 A1    Jul. 23, 2015

(51) Int. Cl.
| H03M 13/00 | (2006.01) |
| H04L 9/32 | (2006.01) |
| G06F 12/14 | (2006.01) |
| G06F 11/10 | (2006.01) |
| G06F 21/00 | (2013.01) |

(52) U.S. Cl.
CPC ........ H04L 9/3226 (2013.01); G06F 11/1088 (2013.01); G06F 12/1408 (2013.01); G06F 21/00 (2013.01)

(58) Field of Classification Search
CPC ... H04L 9/3226; G06F 12/1408; G06F 21/00; G06F 9/441; G06F 11/1088
See application file for complete search history.

(56) References Cited

U.S. PATENT DOCUMENTS

| 3,700,870 | A | * | 10/1972 | Howell | H03M 13/05 365/189.07 |
| 3,825,903 | A | * | 7/1974 | Brown | G06F 12/1466 711/163 |
| 4,040,034 | A | * | 8/1977 | Belady | G06F 11/3476 711/163 |
| 4,521,879 | A | * | 6/1985 | Gueldenpfennig | G06F 15/16 370/267 |
| 5,422,998 | A | * | 6/1995 | Margolin | G09G 5/393 345/519 |
| 5,442,704 | A | * | 8/1995 | Holtey | G06Q 20/341 235/380 |
| 5,600,847 | A | * | 2/1997 | Guttag | G06F 7/57 345/501 |
| 5,903,871 | A | * | 5/1999 | Terui | G11C 7/16 704/270 |
| 6,049,866 | A | * | 4/2000 | Earl | G06F 12/0802 711/123 |
| 7,579,683 | B1 | * | 8/2009 | Falik | G11C 5/02 257/678 |

(Continued)

OTHER PUBLICATIONS

U.S. Appl. No. 61/849,310 Provisions Patent—Jan. 25, 2013 Ralph John Hilla.

(Continued)

Primary Examiner — Guerrier Merant
(74) Attorney, Agent, or Firm — Billion & Armitage; Richard E. Billion

(57) ABSTRACT

This invention requires a slight modification to the Microprocessor with the addition of comparators and a latch, and the addition of a multidimensional array for what is in RAM. The Storage Device also has the addition of comparators and a multidimensional array for what has been passed to the Microprocessor and includes a pointer to the area of the Storage Device. There is an addition of an IEP card for handling Internet activity. The IEP card can help control advertising and serving WEB pages.

15 Claims, 6 Drawing Sheets

(56) References Cited

U.S. PATENT DOCUMENTS

| | | | | |
|---|---|---|---|---|
| 2001/0052062 A1* | 12/2001 | Lipovski | G11C 7/065 | 712/32 |
| 2002/0166038 A1* | 11/2002 | MacLeod | G06F 12/1027 | 711/202 |
| 2003/0014653 A1* | 1/2003 | Moller | G06F 21/572 | 713/193 |
| 2003/0229752 A1* | 12/2003 | Venkiteswaran | G06F 8/665 | 711/103 |
| 2005/0270817 A1* | 12/2005 | Takeuchi | G11C 29/789 | 365/11 |
| 2006/0271694 A1* | 11/2006 | Matsuo | H04L 12/4135 | 709/229 |
| 2007/0100701 A1* | 5/2007 | Boccon-Gibod | G06F 21/10 | 705/21 |
| 2008/0141016 A1* | 6/2008 | Chang | G06F 11/1433 | 713/2 |
| 2008/0162831 A1* | 7/2008 | Herz | G06F 13/4059 | 711/154 |
| 2009/0248963 A1* | 10/2009 | Ito | G06F 12/1433 | 711/103 |
| 2011/0170334 A1* | 7/2011 | Park | G11C 13/0004 | 365/148 |
| 2011/0320758 A1* | 12/2011 | Craddock | G06F 12/0292 | 711/206 |
| 2014/0215129 A1* | 7/2014 | Kuzmin | G06F 12/0246 | 711/103 |
| 2014/0313824 A1* | 10/2014 | Yoon | G11C 11/56 | 365/185.03 |

OTHER PUBLICATIONS

U.S. Appl. No. 61/850,557 Provisions Patent—Feb. 20, 2013 Ralph John Hilla.
U.S. Appl. No. 61/960,005 Provisions Patent—Sep. 9, 2013 Ralph John Hilla.

* cited by examiner

OpSys Ram Size

Shown As 1 Byte Per RAM Address In the "Prefetch Queue"

RESTRUCTURING THE COMPUTER AND ITS ASSOCIATION WITH THE INTERNET

CROSS-REFERENCES TO RELATED APPLICATIONS

This non-provisional application claims the benefits of the filing dates of United States Provisional Patents:
Claims priority of provisional application 61/849,310, filed on Jan. 25, 2013;
Claims priority of provisional application 61/850,557, filed on Feb. 20, 2013;
Claims priority of provisional application 61/960,005, filed on Sep. 9, 2013
Which are hereby incorporated herein in their entirety by reference.

BRIEF SUMMARY OF THE INVENTION

This is an Anti-virus computer that does not require Anti-virus software. There have been slight changes made to both the Microprocessor and the Storage Device Electronics. There is an addition of an Internet Electronic Package (IEP card) that can be within the Microprocessor or be external, including a stand-alone card outside of the computer. The IEP card allows for changes to the Server Company, reduces cost, and significantly adds more positive functions to the Server Company. There is also a strengthening of passwords.

TECHNICAL FIELD

The present invention relates to telecommunication devices such as, but not limited to, personal or business computers, cellular phones, or electronic tablets that are susceptible to malicious software threats. Instead of relying on software to fix the problem, this invention relies on a hardware fix for solving the problem. It requires very slight changes to the Microprocessor and the Storage Device Electronics for the improvement. With this improvement, the computer can also safely handle more activity that is normally associated with Server Companies such as serving WEB pages to social media. This can be handled through the Microprocessor or with the addition of a card that resides inside or outside the computer. Working with the Server Company, this card or electronics can help control wanted and unwanted advertising for the client and greatly enhance WEB page searches for Search Engine Companies. Many people and businesses are sending important information to the "Clouds". Unfortunately, a person does not actually know how safe their information is stored at a "Cloud". They too can be hacked into from an outside or inside source. And the "Clouds" are not free, they do, or more than likely will, cost individuals money. There is also an improvement for passwords that can be used at the owner's discretion.

BACKGROUND ART

Since the advent of the Internet, malicious software has been plaguing the telecommunications industry with one problem after another. Anti-virus software has to be constantly updated because the people who write the malicious software work around the new anti-virus software as it is released. This creates a vicious circle that always leaves gaps for the innocent computer user to fall into. This problem not only plagues the personal, business and government computers, it also affects the Server Companies. They too get hacked into, whether from an outside source or internally. The only viable answer to these threats to this point has been through the use of software, and it does not work without constant updates. The "Clouds" that are used for storage of information can also be hacked into either from an external source or internally. The "Clouds" can also be expensive to use depending on how much data and how long a person or business wants to save each bit of the "Cloud" data.

The storing of WEB pages at a Server Company is also an expensive item. Additionally, if a person wants to be involved in different types of social media, this too can be expensive. If a person is not directly charged for the service, they will more than likely be harassed with unwanted advertising.

A password can be associated with an IP Address for access to accounts or other files. This password can be hacked from an outside or inside source. This can happen at banks, medical facilities, or just a personal computer that holds sensitive information.

DISCLOSURE OF THE INVENTION

The change to the Microprocessor can be viewed from two perspectives. One approach would be to have many sets of comparators, either two or three comparators per set, and an accompanying latch with each set of comparators. Each set of comparators and latch would bracket an application/s that is in a linear portion of RAM, not fragmented. With three sets of comparators, there can be a read only area as opposed to all read and write. The other, and better, approach would be to have one set of comparators and latch that is reloaded when the operator of the computer switches from one application/s to another application/s. In either case, the entire latch is not readable by anything in the Microprocessor and/or RAM. It is only the Operating System (OS) that can read a portion of the latch. No other applications in RAM can read any of the latch information. The OS will create a multidimensional software array for each application/s loaded in RAM and will also include part of the information that is loaded in the latch. Nothing in the Microprocessor region can write data to the latch. Loading or writing of the latch will be done with the Storage Device Electronics only. The latch can hold three things: a loaded bit, a latch number, and a Zone/folder number. The OS can read the first two items only, not the Zone/folder number.

The Storage Device Electronics will load the entire latch in the Microprocessor portion. The Storage Device Electronics will also read the latch when an application in the RAM area wants to retrieve or store a data file. When a data file from RAM is sent to the Storage Device Electronics, the latch information will be at the front of that packet. When an item in RAM wants to read a data file from the Storage Device, the latch data will also be at the front of the packet. When the OS is loading one or more applications into RAM the Storage Device Electronics will reload the latch. The Storage Device Electronics will also create a multidimensional software array for each application/s loaded up into RAM. This will include, but not limited to, the Zone/folder number that is not accessible to anything in the Microprocessor. The Storage Device Electronics will do filtering as far as retrieving and storing data files with the Zone/folder number. The Storage Device will also have multiple sets of comparators, but no latches. After the boot-up routine, certain Zones/folders of the Storage Device will be protected with these sets of comparators.

The electronics or card that is inside or outside the computer, can be an additional item that thwarts malicious software from disrupting WEB pages. Call this the Internet Electronics Package, or IEP card. This IEP card should have at least one set of comparators that would be used in the event a "Spider" were to examine WEB pages. The "Spider" and a copy of the WEB pages would be placed inside the set of comparators. Normally there would be no other application running on the IEP card except the IEP card OS. Because no other application is running, the WEB pages should be safe. The IEP card will have multiple sets of connectors for USB and also another dedicated Storage Device connector. The IEP card will be able to service "Friendly Clouds" by storing the data on USB or a Storage Device on the IEP card or the "Friendly Clouds" can be sent to the main computer if it has been selected to and it is on. The IEP card has the ability to be on 24-7 and during AC power failures because of its DC battery backup.

With the cooperation of a Server Company and Search Engine Companies, the IEP card, if it is servicing WEB pages, can perform "Spider" tasks and send that condensed information to the Server Company for pickup by the "Spiders". This will save a huge amount of time. The Server Company, and the client with an IEP card, can also do social networking services. Additionally, the Server Company and the client with an IEP card can do wanted and unwanted advertising filtering.

Passwords can be made more complex with the addition of multiple passwords and controlled wait periods. There can also be an algorithm that changes the password automatically with each use. This would be good to put in place with the clients Server Company and people who are using the "Friendly Clouds" with the client or owner of the computer. This can be personal or business use.

BEST MODE FOR CARRYING OUT THE INVENTION

Storage Device and Microprocessor for the Anti-Virus Computer

Figure 1:
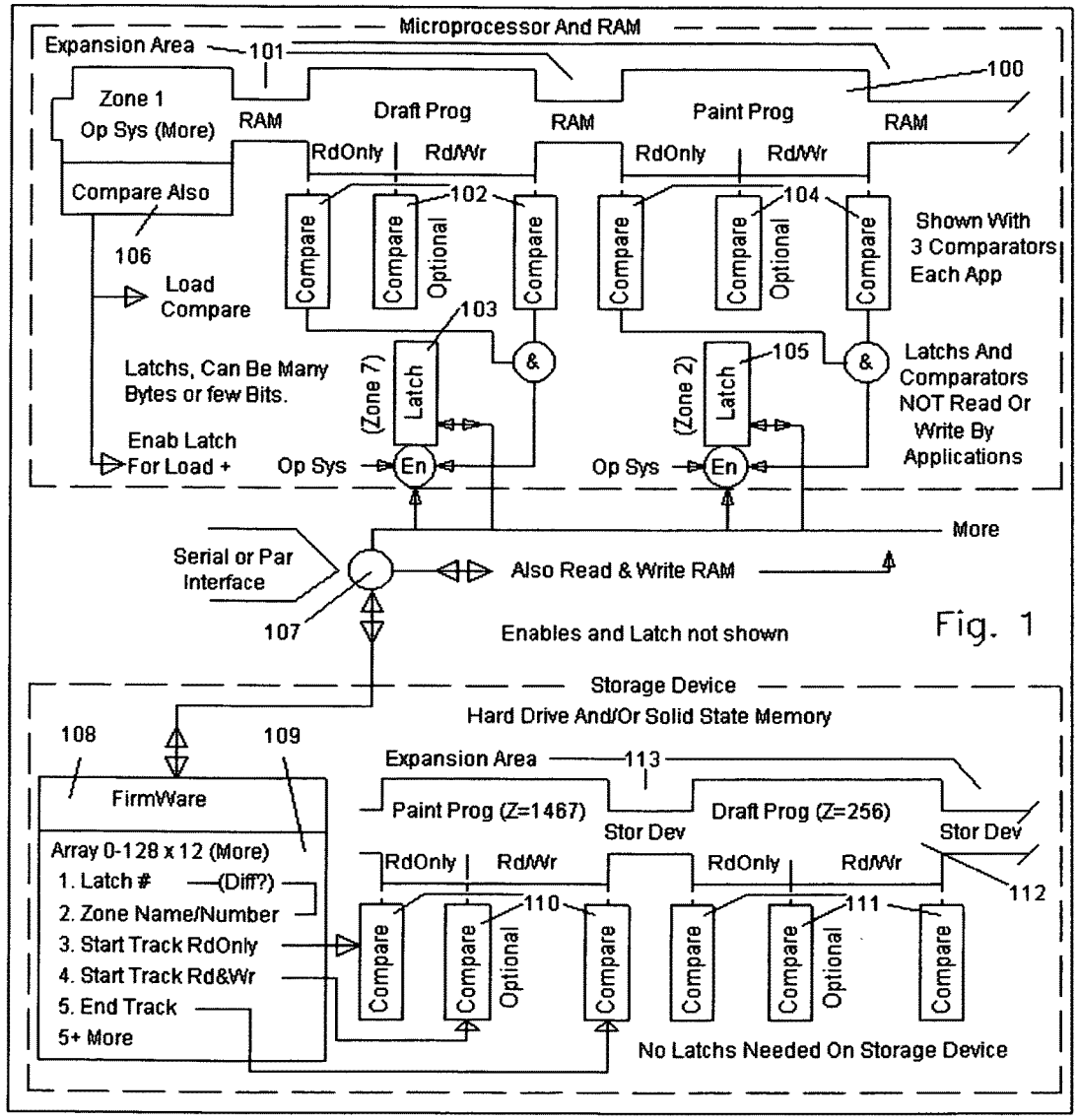
FIG. 1 is an overview of the microprocessor and Storage Device showing multiple sets of comparators.

Please view FIG. 1 for an overview of the Anti-Virus portion of this patent. Changes have been made to both the microprocessor and the hard drive or solid state memory electronics. The upper portion of FIG. 1 is the microprocessor. There are two main additions to the microprocessor. First are the sets of comparators 106 & 102 & 104 and next are the latches 103 & 105 that go with each set of comparators. The Operating System comparators 106 do not have a latch. The lower part of FIG. 1 is the hard drive or solid state memory, which I will call from now on the Storage Device or the Storage Device Electronics. The Storage Device can have many sets of comparators but I have only shown two sets for now 110 & 111. The Storage Device does not need latches with their sets of comparators.

In the microprocessor part, the sets of comparators can be of two types. The first type can be just two comparators for each set. Between the comparators, everything would be considered a read and write area for the application/s loaded in that area. The second type, which I have shown 102 & 104, can be comprised of three comparators. With this configuration, there can be a read only area and a read and write area within each set. This last set with three comparators can be configured such that the read only area is minimal to none existence, hence replicating the first type that only has two comparators.

When an application, and possibly additional applications associated with that application, and files is loaded into RAM 100, it is given a linear space in RAM, not fragmented throughout RAM. Its operation will be within the boundaries of the comparators 102 & 104 given to it by the Operating System. If multiple applications are loaded into RAM, each with their own set of comparators, the Operating System should if it can, leave a none used area of RAM between each loaded application 101. This can be used for fast expansion of an area if needed. See FIG. 1 for an example.

Figure 2:
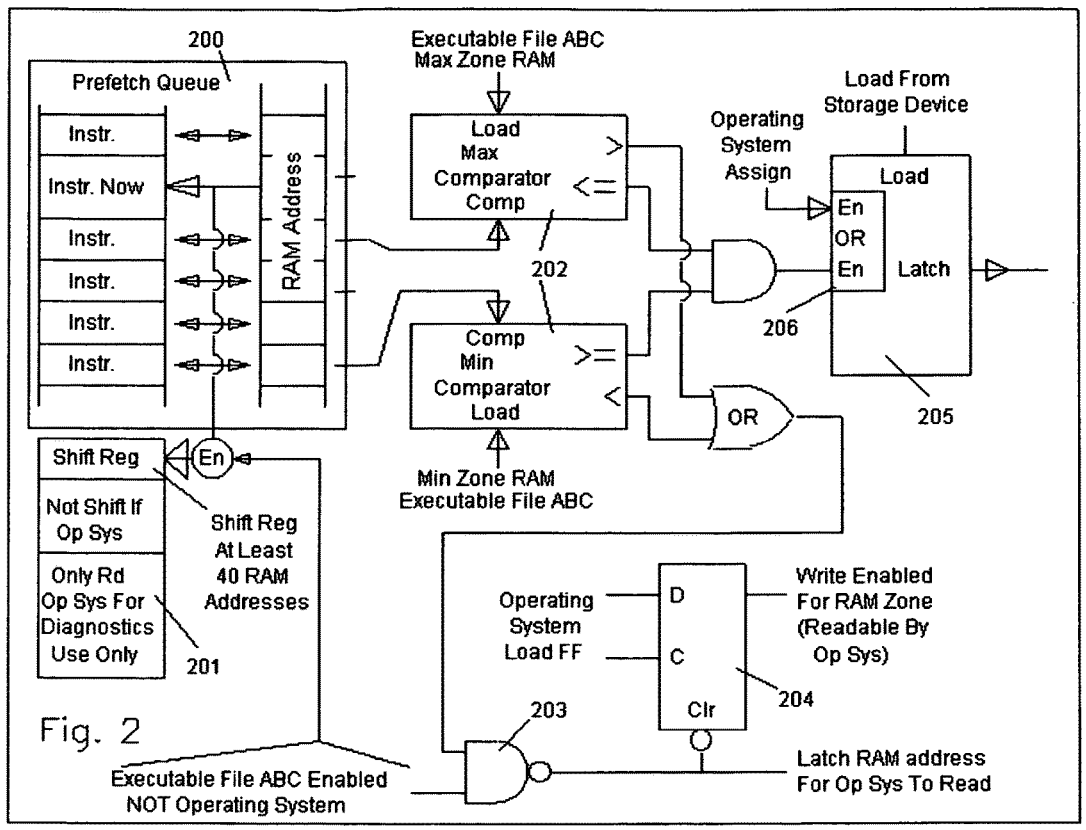
FIG. 2 shows the Prefetch Queue and possible connections to the comparators and how a fault can occur and the diagnostic shift register.
Figure 3:
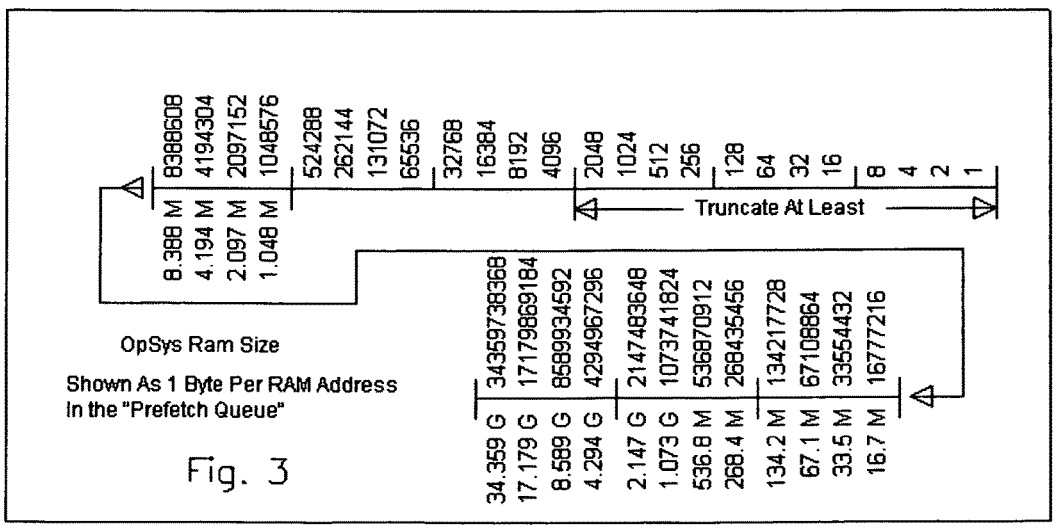
FIG. 3 shows how many bits can be saved if truncation is used for the comparators.

The address on the comparators for the microprocessor is tied to the RAM address at the "pre-fetch queue". This can be viewed in FIG. 2, 200. The entire RAM address is not tied to the comparators. Instead, for a faster comparison result, the lower RAM address is truncated. See FIG. 3 for an example. FIG. 3 shows the RAM as a single byte; however, it is usually 2 or 4 or more bytes for each memory address. The truncation can be adjusted for the best practical speed results. Because truncation is used on the comparators, the memory allocation space in RAM should be set on the boarders of that truncation. As an example, if a truncation were set at a 1024 boundary with 4 bytes per address, then the boundaries for applications loaded in RAM would be placed at 4096 intervals. The result of this is that both ends of the comparators would be accurate even though the lower bits are not in the comparators.

On the Storage Device, if it is a hard drive, truncation would not be needed for its comparators 110 & 111 only shown. However, if the Storage Device has solid state memory, truncation might be required as described in the above paragraph for the microprocessor and RAM.

Because the owner of a computer system may not have the maximum amount of memory installed in RAM for the microprocessor, the upper bits should be designed such that they can be disabled or enabled in the comparison of all of the comparators. This will change from computer to computer and in the future. An alternative to placing the disable or enable in the comparators would be to have a pull-up or ground on the unused memory lines. A disadvantage to this is that it can produce extra capacitance that could slow the microprocessor down. Enabling or disabling the upper bits of the comparators or pull-up or ground on the memory lines should be done during the boot-up routine and disabled from changing once that change has been made or before the end of the boot-up routine. This can also be true for the Storage Device comparators.

Figure 4:
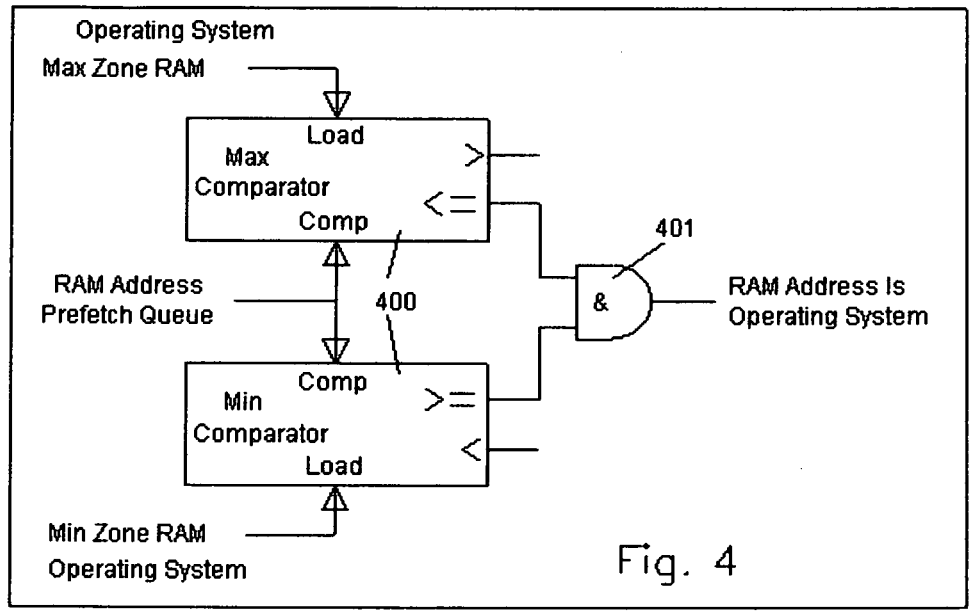
FIG. 4 shows the Operating System comparators in RAM.

No applications in RAM, except for the Operating System, can read or write to any of the comparators even in the Storage Device. That is restricted to the Operating System and/or the Storage Device Electronics. The Operating System also has a set of comparators as shown in FIG. 4, 400. The output of the AND gate 401 is used in more than this situation (loading the comparators) as shown in FIG. 4. When the computer is first turned on, the comparators dedicated to the Operating System is given the minimum and maximum amount and then later changed by the Operating System during the boot-up routine. The Operating System can change its size during the operation of the computer.

When the Operating System is going to load an application or applications and files into an area of RAM, the first thing it should do is load the set of comparators, 104 as an example, with the minimum and maximum RAM addresses for that area. I will be referring to this as Zones. A person can also view this as major folders when a program such as "Window Explorer" is clicked on and first displayed on the screen of the computer. The Operating System should also create a multi-dimensional array that holds the application, start and end RAM addresses, free space, which set of comparators or the numbers for the comparators, the latch number (not the Zone number). The array should also have the start and end RAM address for each application loaded into a Zone. If an application in RAM is running, not the Operating System, and it makes an attempt to go outside of its comparators set range, a fault should occur and execution will be given back to the Operating System. In FIG. 2 there is on OR gate that will clear a flip-flop 204 in the event an application goes outside of the comparator range and this event should disable the write and read and send a call to the Operating System. The Operating System can enable the flip-flop with the "and" gate 203 in FIG. 2. This is true for each set of comparators in the microprocessor area. Clicking on a flag by the operator of the system should explain what has happened and what options exist. In FIG. 2 in the lower left portion is a shift register 201. This shift register is only shifting the RAM address and only shifts if the Operating System is NOT in control. The only application that can read this shift register is the Operating System, hence the AND gate in FIG. 4, 401. This is used for diagnostics only. The shift register should be at a minimum of 10 or better yet 40 RAM addresses. The operator of the computer system can be notified that a fault did occur. The Operating System can notify the operator which application made the fault and which addresses where in the shift register FIG. 2, 201. The actual addresses of the shift register would be offset depending where in RAM the application was loaded. This information can be sent to a diagnostics center more than likely on the Internet for determining what went wrong and why. This would include the application(s) loaded in that area. There would be a great possibility that malicious software was involved.

In FIG. 1 in the top microprocessor part there are latches 103 & 105 shown. These latches 103 & 105 could be in the Storage Device Electronics but more cables would have to be added between the microprocessor and the Storage Device Electronics. These latches 103 & 105 are used to hold the Zone number, or a pointer, a loaded bit and a latch number, which it receives from the Storage Device Electronics. These latches 103 & 105 can not be written or read by application(s) in the microprocessor, however the Operating System will have limited access only to read some of the contents of the latches. The Operating System will not be able to read the "Zone" number of any latch 103 & 105. At boot-up, or when an application and its associated files are removed from RAM of the microprocessor area, these latches are always cleared out. Loading of these latches is accomplished by the Storage Device Electronics only. A wire can be added in the cable between the microprocessor and the Storage Device Electronics for enabling a latch 103 & 105 for reading or writing. There can also be a wire to indicate a read or write function of a latch 103 & 105. The cable between the microprocessor and the Storage Device Electronics should not be compatible with older versions of the cable. The Storage Device Electronics can read back the information in the latches at any time. Whenever execution is being transferred to another area or application(s) in RAM, the proper latch 103 & 105 has to be enabled for that zone. This can be done with the Operating System and/or the set of comparators that are enabled, FIG. 2, 205.

Each of these latches 103 & 105 could be designed to hold many bytes or a folder name. With that design, they could hold a name such as a major folder such as the display in "Window Explorer". However, this would be inefficient. The latches could also be designed to hold an entire Zone number. This too would be inefficient because there can be many hundreds of Zones. A better way would be to select a binary number that represent the maximum number of applications that a person might have loaded into RAM at one time. Four bits would allow sixteen items; five bits would allow thirty-two items to be loaded at one time. So the latches should be capable of holding from four to eight bits at least. There should also be at least one bit to indicate the latch is loaded. Optionally, each latch could have a unique number that is hard designed into the latch 103 & 105. The Storage Device Electronics can create a software array for holding the latch 103 & 105 information including the optional unique/Zone/folder number and RAM information that has been uploaded to the microprocessor.

The software array for the Storage Device, FIG. 1, 109, should include at least the following items. The optional unique number of the latch, pointer number sent to the latch, disk Zone and/or major folder name, start track read only, start track read and write, end track, free space read only, free space read and write. There could of course be more items.

If the Operating System is clearing an area out of RAM, the Operating System should first have the proper latch, FIG. 2, 206, enabled so that the Storage Device Electronics can access the correct latch. Next the Operating System should notify the Storage Device Electronics to clear that latch and also clear that line in the Storage Device Electronics software array. The Storage Device Electronics should read the latch before clearing it and verify which line is the correct line in its array. The Operating System should have the ability to enable any of the latches if it has to, FIG. 2, 206. The Operating System should also clear the line in its array of the application/s being cleared.

Once an application, or applications, has been uploaded into RAM, the Zone or folder where it came from on the disk is held in the Storage Device Electronics software array. When that application requests a data file, the Zone number and latch number is first sent down to the Storage Device Electronics with the requested file. When the Storage Device finds the file in the LUT, it will look at the array and determine if the Zones match. If there is a match, the file will be sent to RAM. If there is a mismatch, the file will not be sent and an error message will be sent to the Operating System for display so that the operator can make a decision as to what to do. Some computer systems may allow an override of the error while others may not.

In the Storage Device Electronics, all of the electronics for sending and receiving the packets of data to the latch 103 & 105 in the microprocessor should be in firmware, not changeable ever. This also includes the deciphering of the latch information, acceptance or rejection files, error notification, and the construction and control of the array for the latches. If the operator/owner of the computer is saving a new data file, one that is not listed in the LUT, the Storage Device should send a notification to the Operating System. The Operating System can ask if they want to save it in the active or current Zone/folder (yes or no) and optionally listing the Zone/folder. The Operating System can send the response, same or different Zone/folder, to the Storage Device Electronics for storage.

There can be times when the same application or data file is uploaded into RAM but in different zone areas of RAM. To cut down on redundancy on the Storage Device, some applications or files can be placed in a "Copy Zone". This "Copy Zone" would be a read only Zone protected with a set of comparators during normal operation of the computer system. During the boot-up processes of the computer, the Operating System would look at a "Transfer Zone" to see if an application or file should be transferred to or removed from the "Copy Zone". After the boot-up is complete, the comparators would be set around the "Copy Zone" to read only. A data file, associated with an Icon, would provide loading for multiple applications into one area of RAM in the microprocessor portion of the computer. Within the data file, the dominating Zone or area of the Storage Device would be called out. This would normally be associated with the first application added to the list of applications. This dominating Zone would be the pointer to the area on the Storage Device, not ever the "Copy Zone" which would constitute an error. Items can be loaded into the "Transfer Zone" by the operator of the computer at any time. Password protection can be added to the "Transfer Zone" to allow only wanted additions. The Icon and associated data file for uploading the files to RAM can be placed also into the "Transfer Zone" and eventually into the "Copy Zone" at boot-up. Items can be removed from the "Copy Zone" by placing a removal file into the "Transfer Zone". This removal file should also be password protected. This data in the transfer zone can be cleared by the Operating System or firmware after the transfer has occurred. In most cases, there should also be a unique CRC-R code generated for each application or file added to the "Copy Zone". This algorithm for the CRC-R code should not be the same from Storage Device to Storage Device or from application to application. The "-R" stands for randomized. Of course any and all read only Zones can still allow the servo to read on the Storage Device if it is a hard drive.

Other items that can also be in the "Copy Folder" would be CRC codes associated with files and IP addresses. Again, this would be a read only after the boot-up routine.

During the power up cycle or boot-up routine, the comparators have to be disabled. This can be accomplished in more than one way. One way would be to load the max comparators with the maximum number and the low comparators with zero. Another way would be if the flip-flop in FIG. 7, 701 were to disable the comparators. The comparators in the microprocessor also have to be disabled and it could be a similar process. A wire from the flip-flop in FIG. 7, 701 could be run to the microprocessor from the Storage Device Electronics. During the boot-up process, the Operating System could verify CRC-R codes with the matching applications. This checking could mean the "Copy Zone" and all other zones that hold applications. There should be a file or program that the owner of the computer can pull up and fill out which applications and data files they want to be checked at every boot-up, including a cyclic routine. In the event of an error in a CRC-R code, the owner or operator should be notified and given suggestions as what to do. During the boot-up routine, the Operating System should also check to see if an IEP card is connected. If it is connected, it should verify the real time clock on the IEP card against the real time clock on the computer. If there is a mismatch of some selectable programmable amount, the operator should be notified for action or optionally automatic. The Operating System of the computer should also check the IEP card for messages such as E-mail and free space in the IEP cards different memories. WEB page information can also be checked. The Operating System of the computer should also check the good and bad IP addresses in case changes were made. If a warm reboot-up is made, the microprocessor should clear all of RAM and start over. Easily, some items for the good IP Address list could be; police, fire, schools, dinning just to mention a few.

Because a person can have many applications loaded in RAM at once, it is hard to predict how many sets of comparators 102 & 104 are needed including the accompanying latches 103 & 105. The computer manufacturer can offer different numbers of sets of comparators with different microprocessors. As an option, sets of comparators can be multiplexed. If this is to be an option, then the latch 103 & 105 also has to be multiplexed with its associated comparators 102 & 104. Because switching from one application zone to another application zone should go through the Operating System, this is a viable option. However, the Operating System should not know what each latch 103 & 105 is holding as far as the "Zone" number. Therefore, there will have to be many latches that are loaded and enabled.

Figure 5:
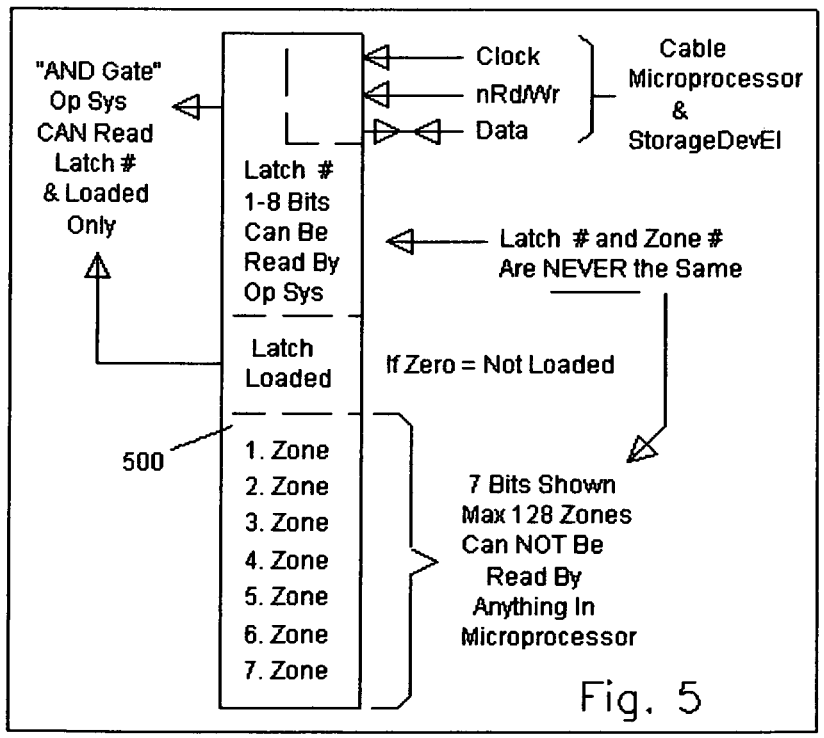
FIG. 5 shows the latch used in the single comparator set of the microprocessor.
Figure 6:
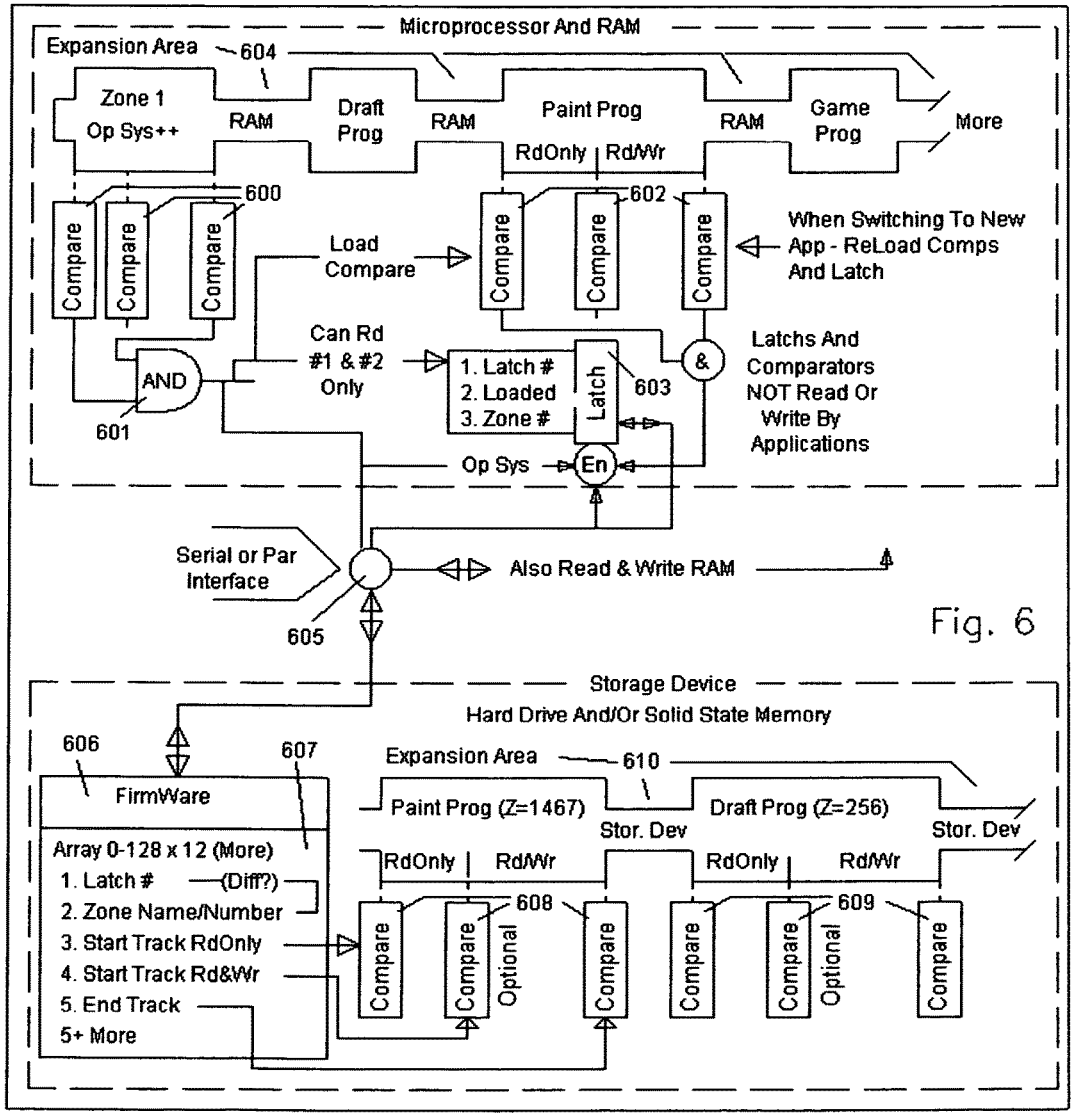
FIG. 6 is an overview of the microprocessor and Storage Device showing a singular set of comparators.

Optionally, there could be a latch as shown in FIG. 5, 500. This latch 500 would hold three things: a loaded bit; the Zone number; a latch number. The Storage Device Electronics, as mentioned before, will have an array for items loaded up into RAM. An additional item in the array would be the latch number for each application loaded. This latch number would be loaded into the latch in the microprocessor by the Storage Device Electronics. See FIG. 6 please. The latch number can be read by the Operating System and placed in its own array with the other information as mentioned also above. The Operating System can read the latch number and the loaded bit, NOT write them. Additionally the Operating System can read the "nRd/Wr" signal controlling the loading of the latch. The "AND gate" would be used again which defines the Operating System is in control. This "AND Gate" function should also be on a cable that goes to the Storage Device Electronics. The Operating System would NOT be able to read or write the Zone number which will always be different from the latch number. The size of the latch number must be equal to or greater than the Zone number in the latch. When the operator of the computer decides to switch to another application zone in RAM, the Operating System will send down to the Storage Device Electronics a request. The Operating System will look up in its array which latch number will be the new latch number and send that down to the Storage Device Electronics with the request to reload the latch. The Storage Device Electronics will reload the latch with the new latch number and the non-readable Zone number that accompanies that latch number. The Operating System can verify that the latch has been reloaded by reading the new latch number in the latch. Once this has been completed, the Operating System can reload the set of comparators, FIG. 6, 602 with the correct RAM addresses and pass control to the new application. With this configuration, there may only be two sets of comparators needed in the microprocessor. The Operating System should not need a latch with its set of comparators, it has the "AND Gate", FIG. 4, 401.

Whichever type is used for the sets of comparators and latches above, there is only one set of comparators and latches enabled at one time.

Figure 10:
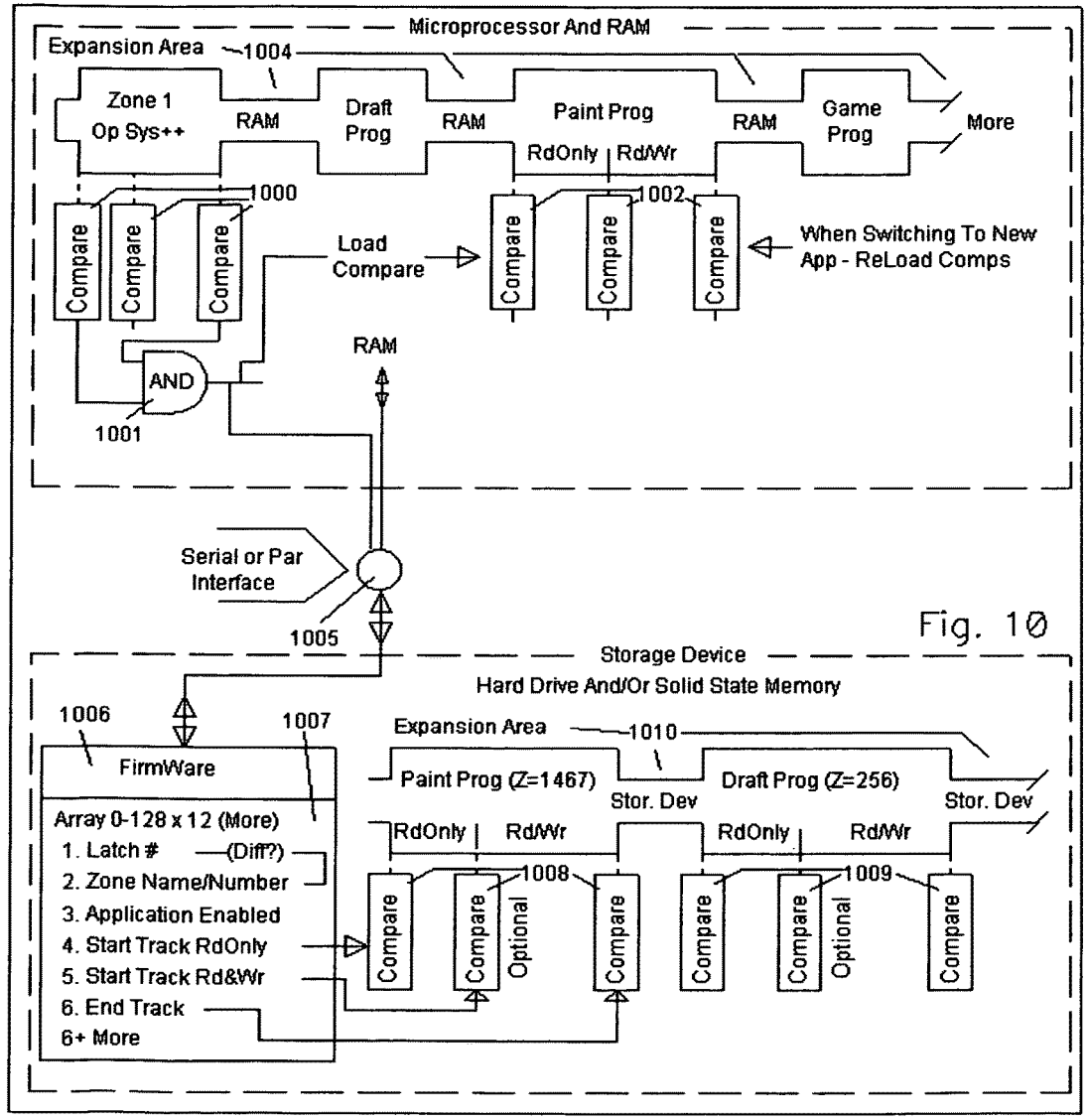
FIG. 10 is an overview of the microprocessor and Storage Device showing multiple sets of comparators without the latches.

In FIG. 1, there are multiple latches shown, 103 and 105, and there can easily be more. Also in FIG. 6 there is one latch, 603 shown. There is another option that can accomplish the same task as the latches. Please view FIG. 10. In both FIG. 1 and FIG. 6, the latches do not have to be there. In the multidimensional arrays of both the Microprocessor and the Storage Device Electronics, there can be a column that would be the pointer for which application/s in RAM that are in control. When a new application/s is being loaded into RAM, either the Microprocessor or the Storage Device Electronics can set the pointer, such as "AA" or "03" or "b1", and pass it to the other device. Because all changes of applications will have to go through the Operating System, the pointer can be sent from the Operating System to the Storage Device Electronics during a change. Both the Operating System and the Storage Device Electronics multidimensional arrays can have a column for which item or row is in control. When a data file is requested or being stored, the pointer can still be sent at the front of the packet. When data is passed or requested from the Storage Device, the Storage Device can look in its multidimensional array for authentication or validation of that data. This modification can apply to both FIG. 1 and FIG. 6.

A Zone/folder on the Storage Device can be used to hold sensitive information that should be restricted to that computer or company (recent news about Countries breaking into business and government computers). This could be used in business, government or wherever there could be important information such as medical records, social security numbers, design files, military, Friendly Clouds, etc. A Zone/folder on the Storage Device can also be password(s), fingerprint, eye retina, voice protected from access. The Storage Device can have up to two sets of floating comparators that it disables for read and write that are adjacent to the active Zone/folder of the application(s) operating in the RAM of the microprocessor. The Storage Device can disable all other set of comparators from read and writing as mentioned in the following paragraph. With an additional set of three comparators, the Storage Device can also set a read only and read and write area of the active Zone/folder that is being executed in RAM of the microprocessor. The Operating System of the microprocessor can pass to the Storage Device Electronics which latch number is active, as an option the Storage Device Electronics can poll the latch for the information.

Here is a list of zones on the Storage Device to consider at the start: Directory or LUT; Operating System; Operating System 2; Replacement Zone, Transfer (Copy at boot-up); "Holding Zone"; "ID Zone"; "ID Zone Test"; Delete (Recycle); IP address and Passwords (good and bad); Internet Documents; Internet Applications; Internet Usage; Games-01; Games-02; Games-more; Windows; My Documents; WEB Design; WEB pages; Pictures; E-mail-01; E-mail-02; E-mail-more. These "special areas" can be resized or even moved to a different area of the Storage Device. This should only be done with the Operating System and/or the Storage Device Electronics and the operator/owner of the computer. The operator/owner should be able to define how much free space an area might need. Both in the LUT and the boot-up Zone, these special areas should be listed as a no access areas with the track or address start and end and their names. The operator/owner can have access to these areas with the use of the Icon and password(s) or other security items such as eye retina, thumb print or more.

In the above paragraphs, zones "ID Zone" and "ID Zone Test" were mentioned. These Zones could hold information about the different applications that are loaded on the Storage Device. It can hold information about the factory, the time and date each application was loaded, a CRC-R number, and serial numbers. These Zones should only be accessible to the Operating System or the Storage Device Electronics. If an application in one of these Zones is to be updated from the Internet, the old application should first be renamed and stored for holding and possible replacing at some later date.

Zones can be large or small. When a computer is coming preloaded with applications from the factory, all of those applications can be loaded into one Zone. That Zone can be in hundreds of Gigabytes. As an option, still coming from the factory, those pre-loaded applications could be broken into many different smaller Zones. It should be strongly considered that once the computer is in the hands of an individual, business or government agency, new items being placed on the Storage Device should be placed in a new Zone. This is especially true for items being downloaded from the Internet.

Some information on a computer might be sensitive or secrete information. These computers can belong to private individuals, businesses, or government agencies. There should be a questionnaire that can be filled out for each Zone/folder or files associated with a Zone/folder. This questionnaire would be triggered if an attempt is made to move a file, or part of a file, to another device such as, but not limited to, a USB, CD, Music, Video, FireWire, Internet, or another Storage Device. There should be an indicator with each Zone/folder if the questionnaire has been filled out. This could be a color such as red or green or a smiley face or frown. When the mouse is dragged over this indicator there should be a highlighted phrase. This questionnaire should be capable of being filled out by one person and downloading to multiple computers, as in a business or government agency, to be loaded and filed automatically on employee's computers. As an option, if an employee at a business or government agency triggers an event, that computer can go to the hub of the business or government and request the questionnaire that is already filled out. There can be different questionnaires filled out for different employees. If there are portable computers that the employee can take home, the default setting should be to deny any device except the Storage Device on that portable computer from storing any data. If the questionnaire is not filled out, then the assumed, or default setting, would be that there is no sensitive or secrete information and any move can be completed. This questionnaire can reside in the boot-up Zone where no applications can gain access to its information. Filling out these questionnaires should be at least one or more of the following, password, eye retina, fingerprint protected. The results of the questionnaire can be held by the Operating System when it fetches them during the boot-up routine. The software should react to the items filled out on this questionnaire:

Does this Zone/folder hold sensitive or secrete information?
If this Zone/folder can send any data out to another device, such as USB, CD, Video, Music, Fire Wire, Internet, which of these devices can it send to?
Can this Zone/folder send any data out through the Internet, to what IP addresses?
If the device is the Internet, should confirmation be sent back?
If confirmation is to be sent back, what are the valid IP addresses and/or passwords, if any?
If this Zone/folder can send information to another individual/s, who are they and what IP addresses?
If this Zone/folder is sent out, should it also automatically be sent to a superior and what IP address?
Should a password, eye retina, fingerprint be involved with this transaction?
Should there be multiple passwords, eye retinas, fingerprints involved?
Should the Zone/folder number/name be removed before sending this file?
Should the data that is being sent be encrypted?
If an attempt is made to send a file and it is denied what parties should be notified of this failed attempt and should it be automatic?
If an attempt is made to send a file and it is denied, should a false file be sent in its place?
If a false file is to be sent in its place, which one should be sent?
If an attempt is made to alter any of this information and the wrong password, eye retina, fingerprint is used what parties should be notified of this failed attempt?
Notifying a party can be any or all of E-mail, phone, text messaging, or a warning signal such as sound and/or light.
If an E-mail, phone, text messaging, is sent, the party who triggered this event should be sent within the message.

If a person wants a more traditional way for the Zones, that too can be accomplished. With every file on the Storage Device, whether it is an application or data file, it can have a header that is stored in the LUT with the file name. This enables data files NOT to be placed in a Zone; instead data can be randomly placed throughout the Storage Device. This header would NOT be sent to the microprocessor RAM. It would only be used on the Storage Device, and when sending a file to RAM, the Storage Device would store the header that was in the LUT in its array with the other items as mentioned earlier. If a person tries to load the file and there is no ID information, the Operating System should ask the person loading the file if this is appropriate. If it is marked as OK, the information should then be placed in the array on the Storage Device and also in the LUT. If the OK was marked, and the data file was to be restored to the Storage Device, the software should ask if it should be filed in the appropriate Zone or another Zone.

The header, or ID information, in the LUT can look something like this: "File Name<1234xxxxxxxx>" Only one Zone—those are the "x's; 0 to 255 shown" "File Name<1234xxxxxxxx+xxxxxxxx>" More than one Zone (+, /, \, ^, ( ), more examples) The "1234" would be binary bits (0 to 15 or more if needed) that could represent:

0. Open to all, not assigned (possibly copied from an old computer system).
1. No Zone, no restrictions.
2. Executable file; sets the Zone Number. Can be used with a file for loading.
3. Executable file; does not set the Zone Number. Can be used with a file for loading.
4. Executable file; one or more passwords needed.
5. Data file open to one Zone Numbers.
6. Data file with more than one Zone Number.
7. Data file and restricted, one or more passwords needed.
8. Picture or Video open to one Zone Numbers.
9. Picture or Video with more than one Zone Number.
10. Game, none or many Zones.
11. Music, none or many Zones.
12. Unknown file type.
13. Others?
14.
15. (More than 15, make the 1234 a byte?)

The "xxxxxxxx" or "xxxxxxxx+xxxxxxxx" is a binary Zone #. Again, data from the "<" to the ">" is not sent to the microprocessor, this could be brackets or something else. Instead this information is held in the multidimensional array on the Storage Device, FIG. 1, 109 or FIG. 6, 607. This header should only be in the LUT with the file name. In the above examples, the sector and track number was not shown.

In the above examples, numbers 2 and 3 "Executable file", if this is being loaded with a data file that has multiple executable files, the first one loaded should set the Zone number. Also, if a person is loading one file, or a group of files from a device such as a USB, they can all be placed in a random area of the Storage Device or collectively into one Zone. The Operating System should ask if they should be place randomly, in a current Zone, or a new Zone. If random is picked, the above "1234" would be "0" for each of the files. The Operating System can look at the extension for determining if it is an executable, data file, picture, and so on. If a transfer of a file or files from a device such as a USB is done, there should be a date and time stamp that is included between the "<" and ">" on computer systems such a government. The real time clock on a government computer should not be accessible to the computer operator or the time should be taken from a "Hub" in the office that the employee does not have access to.

If this is a government, business or any computer, there should be an option designed into the real time clock that it can be overridden with a "Hub" connection. If the "Hub" is disconnected there should be a fault and/or an alarm to notify a superior. In the above paragraph, the word "fault" should be imposed instead of a time and date if the "Hub" is removed. The Storage Device Electronics and the Operating System should key on the "fault" word and inhibit use of the file and a superior should be notified.

Because not everybody will take the suggested safety precautions recommended by the Operating System Software when downloading a new application, there is an added bit of security. This is in the event that that application turns out to be malicious. The Storage Device should have a flip-flop 701 that is set during the POMC routine when the computer is turned on. Please refer to FIG. 7. This flip-flop 701, when set, should enable the Storage Device to access all of its tracks or addresses. Later, when the flip-flop 701 is cleared by the Operating System at the very end of the boot-up cycle, not all of the tracks or addresses on the Storage Device will be able to be accessed. The switch 700 shown in FIG. 7 can be used during the boot-up cycle to interrupt the Operating System from clearing the flip-flop 701. The switch 700 does not have to be a Push Button switch. It could be an icon, a thumb print detection, an eye retina detection, a host of different items including just a normal stop with a question to proceed or do some special duties. When I mentioned before that not all of the tracks on the Storage Device can be accessed after the flip-flop is cleared, that is because the Storage Device is going to have an area that will be protected from reading and writing with a set of comparators. When the flip-flop is cleared, this protected area will not allow reading or writing of data. Yes, the servo will be able to operate if it is a hard drive. This protected area will hold the Operating System and more than likely it will also hold other items. Some of the items in this protected area will also be in another area, yes redundant. This protected area will be a linear space, that is to say it will not be randomized throughout the Storage Device. Just to give some examples of what else could be in the boot-up zone: redundant software or applications with its CRC-R code; passwords; WEB pages with their CRC-R codes; IP addresses, both good and bad. The Operating System software during boot-up would also be placed in a linear zone in RAM on the microprocessor. Not all of the Operating System files on the Storage Device have to be loaded into RAM on the microprocessor. Some items may never be used, others used as needed. Some examples would be drivers, or fonts. Any item that is not placed in RAM at the boot-up should also be placed in another area on the Storage Device, redundant copies. This only has to be done once, more than likely at the factory. In addition to the Operating System, the CRC-R codes with the name of the software, the passwords and for which product, the IP addresses would also be read and placed in the RAM on the microprocessor. As mentioned earlier, items can be placed into or removed from this protected area with the "Transfer Zone". When items are being placed in this holding or "Transfer Zone", the software should categorize the items. Some may need a CRC-R code generated. If an item is to be removed, that should be confirmed by the operator through the Operating System software rather than just automatic. In the holding or "Transfer Zone", there could just be a request to copy some software from another zone to the boot-up zone, redundant software with its CRC-R. Placement of information or data in this holding or "Transfer Zone" should be limited to the Operating System with the "AND" gate, FIG. 4, 401.

An important thing for the main microprocessor that should not be overlooked is the connection to the Internet Electronics Package (IEP card, this will be discussed in more detail later). There should be two connectors, one a USB and the other a high-speed link for going beyond the 6-foot limit of the USB. There could also be a normal Internet connector from the IEP card to the main connector. If the IEP card is internal to the computer, there could just be a clip on connector for the computer. There will be times when the IEP card will contact the main processor, and other times just the opposite. When the main computer is talking to the IEP card, the AND gate in FIG. 4, 401 should be used as an enable to either of these connectors, USB and the high-speed link. Having this enable insures that only the Operating System is doing the communication to the IEP card, not some malicious software. Because of this enable for the two connectors, these two connectors should be unique and grouped together on the computer. These two connectors will not act like normal connectors with this enable. The IEP card could also have a normal Internet connection like the input but for output to the main computer.

The Software Company that is writing the code for the microprocessor should also develop some software for the new linear zone scheme. There should be a "Windows Explorer" type that shows each major folder or zone for the Storage Device. At boot-up, this new software should assess how much linear free space each major folder or zone has on the Storage Device. The display can be a smiley face or sad face. It could also be something as simple as to change the color of the lettering from black to red or green. There could also be a display that pops up when the mouse is held over a major folder or zone. The right click on the mouse can display options. When downloading new applications from the Internet, the Software Company should also give recommendations as how to save or store the new data.

Figure 7:
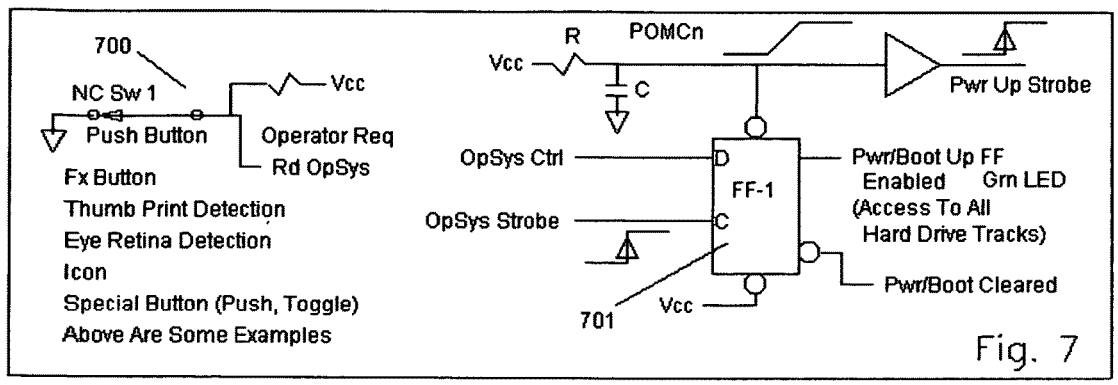
FIG. 7 shows the boot-up flip-flop that will eventually secure the data in the boot-up areas of the Storage Device.

On the Storage Device, besides the boot-up zone that can only be accessed when the flip-flop in FIG. 7, 701 is enabled, there should be an additional zone, call it the Replacement Zone. That zone should be for executable files or data that has been, or is going to be replaced. As an example, if a new Paint program or a new Operating System program has been released. The old programs should be placed in the Replacement Zone first before installing the new software. This zone should not be accessible even if the flip-flop in FIG. 7, 701 is set. That is of course unless the operator of the computer, during a real power on boot-up presses the switch in FIG. 7, 700. Let's face it, updates happen. The Operating System during the boot-up process, after the switch 700 has been pressed, can ask the operator of the computer if that zone should be opened for access.

If an application were to be downloaded from the Internet, USB, CD, etc., and directly placed into RAM, there would be no Zone number. The array in the microprocessor should note that this application can not access anything on the Storage Device. The Operating System should also notify the Storage Device that there is an application in RAM that did not come from the Storage Device and which device it did come from. If the application wants to access something on the Storage Device, it should ask the operator to first download the application to the Storage Device and place it in a new Zone for safest results. That application, if truly wanted, should be saved to the Storage Device first. This application can of course retrieve files from its origin source or copy files to the new location.

In the above "Here is a list of zones on the Storage Device to consider at the start" there was a Zone called IP addresses, names and passwords. This Zone should be protected with a set of comparators on the Storage Device that can only be accessed by the Operating System and the "AND" gate, FIG. 4, 401. As far as the IP addresses, there will be a list of good and bad IP addresses. The owners of the computer can have their own additions to the good and bad list. Also, the Server Company can have suggestions for that list. Additionally, there will be names and passwords that the owner and the Server Company will make to that Zone. There will be more on this later under the Internet Electronics Package and the Server Company sections.

If the Operating System is answering a call from another application to access the Storage Device, the call routine can disable the "AND" gate, FIG. 4, 401 with a flip-flop and re-enable the "AND" gate, FIG. 4, 401 at the end of the call routine (the return).

The Storage Device should have at least six sets of comparators. No latches are required on the Storage Device comparators. Here is a list:
01. The Boot-Up Zone (locked out with the flip-flop at the end of the boot-up cycle).
02. The Redundant Boot-Up Zone (access with the "AND" gate).
03. The IP Address, Name, Password Zone (access with the "AND" gate).
04. The Transfer Zone (access with the "AND" gate).
05. The Copy Zone (Read Only unless operator authorized to add or remove)

06. A General Purpose set (this changes on the fly depending which application in RAM)
07. A set for the "software for the firmware" on the Storage Device (optionally).

Not the entire Storage Device has to be dedicated to Zones. Portions of the Storage Device can be left open for anything, applications to data files. There can optionally be two sets of comparators for the active Zone/folder that executing in the microprocessor RAM that can be reloaded depending on the use to bracket the active Zone/folder.

The microprocessor should need only two sets of comparators for RAM:
01. For the Operating System and additional files or information.
02. For the active application/s (this has the attached latch with the latch number and Zone number and changes with a new selection of an application/s)

Internet Access and Control (IEP Card)

The Internet Electronic Package (from now on referred to as the IEP card) can reside inside the computer or outside the computer. I will give a brief description for the IEP card inside the computer and then a more lengthy description for outside the computer. The function of either are identical in most parts.

If the IEP card is to reside inside the computer, it should have a separate switch for enabling and disabling the power to the IEP card. When the computer is turned off, the IEP card should still be able to interact with the Internet. The whole idea behind the IEP card is that it can both receive data and send data requests on the Internet with the main computer turned off. The IEP card inside the computer should also have an external connection for DC power, which is diode protected. This DC power will provide operation in the event the main power source fails. Connection to a DC power source is optional and up to the owner/operator. The IEP card should have a device that emits a beeping sound and/or an LED that blinks for a short amount of time when the AC power is turned off. In the event that the AC power was inadvertently turned off, this would hopefully get somebody's attention. With a big enough capacitor, the signal could last a few seconds. Both the main computer and the IEP card should be able to read the auxiliary backup battery voltage and flash or sound a warning if low and it is hooked up.

The best way for the IEP card to operate is outside of the computer. Today, many computers are a portable computer, which means they are not stationary. Yet the IEP card more than likely will want to remain stationary near an Internet line whether in a home or business. The IEP card does not need a keyboard, mouse or monitor. There can be connectors for these items, but in most cases they would not be needed or used. The IEP card will still need an external connector for DC power in the event the main power source fails, which is diode protected. Additionally, the IEP card should have from one to three connectors for communicating with the main computer. One connector could be a USB type, another connector could be a high-speed port for distances beyond six feet, and the third could be a standard outgoing Internet connector. Now the IEP card can sit on the desk or a bookshelf or on the floor out of the way.

Whether inside the computer or outside the computer, the IEP card should have its own real time clock with a battery. The main computer should be able to read the real time clock. If the main computer sees a difference, it should be able to flag the operator about the difference. The operator should be able to do nothing or adjust one or both. This real time clock should be capable of adjusting for February during leap years and a programmed daylight saving time. A low battery signal on the real time clock should be able to be read by the main computer and the IEP card. Whether inside the computer or outside the computer, the IEP card should have an Internet connector. The IEP card can have plugs for speakers to be attached or built in. Music or voice messaging, connectors for music memory sticks, either record or play. The IEP card can have plugs for cameras, personal to security recording, and a connector for video memory to record or play.

Whether inside the computer or outside the computer, when the computer is first turned on it should check to see if the IEP card is loaded and running. If the IEP card is not running the main computer should download the necessary software during the boot-up process. Normally the IEP card should only have one application running. For safety purposes, this one application and other additional items can be protected with a set of comparators. In the event that both AC power and DC power fail, the IEP card could have a boot-up process that is downloaded from EPROM or on a USB drive for an automatic reboot. This EPROM or USB drive would also hold the IP addresses, both good and bad, WEB pages and IP addresses associated with passwords. The main computer can have the ability to load or reload the EPROM or USB drive for boot-up. There should be a "write protect switch" on the IEP card to stop any overwriting of these two devices.

Items included in this download should be IP addresses, both good and bad. This should also include IP addresses with passwords. The IEP card will have the ability to reject, another words just dump, bad IP addresses. The IEP card can be programmed to reply to a rejected IP Address or just ignore them. This rejection can be selective.

As mentioned above, the IEP card can hold WEB pages. This does not have to be just one WEB site; it can be multiple WEB sites. Because there can be multiple or large WEB sites, there should be a connector for expansion of the main memory on the IEP card. To aid in this expansion, there should also be a minimum of two USB connectors. Each USB connector should have an LED and a push button. This LED should be a multi-color LED. The push button can be used for removal of a device. There should also be a connector for a Storage Device that can hold Terabytes of data. The IEP card can keep track of "statistics" for the WEB pages; IP Addresses, time and date, which page and more. In the event that both the AC and DC power were to fail, it would be a good idea for any incoming data that has to be saved be saved on a USB or Storage Device. By saving to either one of these devices, the data will still be safe and secure. There could also be static RAM with a battery backup attached to it. If this is to occur, the battery should be monitored by both the main computer and the IEP card. For safety purposes there should be an "AND" gate for access to the connectors for the USB and Storage Device on the IEP card that is controlled by the comparators for the Operating System on the IEP card. As a side note, the main computer should have a small block of memory, such as 10 Megabytes or more, which the Operating System is the only one that has access to. This can be E-prom to battery backed. It should be used for storing things such as results of the questionnaires, IP Addresses, wanted advertising and much more.

The IEP card can also keep track of annoying IP Addresses. An annoying IP Address would be something like a constant incoming request every few seconds or minutes for the same information. The owner can be notified, and if the owner wants just "dump" the requests from that IP Address with or without a return message to the annoying IP address.

The IEP card can sort and store incoming E-mails when the computer is turned off. If the owner/operator wants, a reply can be sent back to the sending IP Address that the receiving computer was turned off but that the received message will be forwarded when the computer is turned back on. This can be a positive thing if the message is an emergency; optionally the sender could send a text or make a phone call. If the memory is full, then the IEP card processor should send back a notification of the status to the sender.

If the owner/operator were active on the Internet, all of the items would be passed through the IEP card to the owner/operator. Even if this were occurring, items that needed filtering would still be filtered. Additionally, WEB pages can still be serviced without the owner/operator being interrupted.

An additional thing that the IEP card can do is assist search engine companies such as Google, Bing, Yahoo. These companies and many more, have what they call "spiders or robots" that examine WEB pages. This can be a time consuming task. With the co-operation of the Server Company, the time the "spiders or robots" spend on WEB pages can be cut dramatically. The Server Company can acquire from each search engine company what their requirements are for a search of a WEB page. This can either be passed to each client that has an IEP card or the Server Company can conduct their own search of their clients WEB pages. The information can be placed at the Server Company in a special file to be read by a search engine company. The file would not have to only hold information for one client. The Server Company could bundle many clients together in one file. The Server Company or client could optionally send that data to the search engine company, another time saver. One advantage is that the clients can comment upon pictures and/or video. Each search engine company more than likely will have different criteria for their search, which is not a problem. One thing that the Server Company and the client can do to help even more is to establish a no change rule. That would be when a page has been analyzed at least once, and there is no change to the page, a simple "Page x No Change or Page x NC". The same can be true for removal of a page "Page x Removed or Page x R" or new pages "Page x New or Page x N". The search engine companies could access each client individually, but it would be quicker to have it bundled at the Server Company. Periodically, each search engine company can actually access the WEB pages for review. There should still be a "robots.txt" file listing the files and images for that WEB site in case the Spider wants to do its own requesting.

In the event that there will still be "spiders or robots" visiting the IEP card, there should be a set of comparators for this occurrence. Any software that the "spiders or robots" have can be placed between the set of comparators including copies of the WEB pages. It would be safest not to let the "spiders or robots" examine the actual WEB pages. When the "spiders or robots" have completed their task, all items between the set of comparators can be cleared out.

Another important function that the IEP card can perform is saving data files for friends. I actually call this function "Friendly Clouds". There are numerous cases of data being stolen that were perpetrated from the inside of a company or government agency. And that is very difficult to protect from. Because the IEP card can be online to the Internet twenty-four hours a day and seven days a week, it would not be a problem to collect data files. These data files can actually be saved on the IEP card itself or when the computer is turned on these data files can be passed through to the main computer to be saved. The owner/operator can select which platform the files should be saved at. Because the IEP card has at least two USB slots for extra memory, hopefully more, it would be easy to store them on the IEP card. The software on the IEP card, or the main computer, should be able to monitor how much free space is left for storage of "Friendly Clouds". With the storage of "Friendly Clouds" there should be a unique password that enables the storage process. With the Storage Devices holding Terabytes of data, that may also be a viable solution to the storage. Because not all people who are setting up a "Friendly Cloud" with somebody has their computer or IEP card on twenty-four seven, they should exchange normal or hours that the exchange more than likely can be made. When I refer to a "Friendly Cloud", I am usually talking about a family member such as a parent, a child, a relative. This can also mean a close friend. There is a very good chance that a person will pick people who they can trust, a "Friendly Cloud". Another item that is nice is that it is very cost effective and more than likely miles apart from you. It would be a good idea to send this important data to more than one remote computer. Here is a list of some software items I have not written:

The IP address that is allowed to read and write data to your computer
    Password/s associated with that IP address
    The amount of memory space allocated to that person or computer
    How much free memory space is still left
    Time and days the computer will be active for that data (24-7, days and hours most likely)
    Name of the file and type of file (.doc, .txt, .xls, .bmp, etc.)
    Can files be deleted
    How long the data should be saved, on or off the computer (flash drive used on a USB port)
    Packet size
    Whether it is ASCII data or encrypted data (this might be a mute point)
    Checksum algorithm, and possibly send that checksum back to the IP Address
    The size of the file being received or sent, is there enough memory space The IP addresses and any passwords associated with them used for the Friendly Cloud should be stored in the boot-up zone on the hard drive. The name of the person and the memory size should also be in the boot-up zone on the hard drive. During the boot-up process, that information should be moved to RAM in the same zone as the Operating System. When the IEP card is being loaded, a copy of the IP addresses, their passwords, the name and size of memory and where to save it should be moved to RAM on the IEP card also. One way to save the information being received and make it easy to read in a chronological order is listed below. The same name is always repeated, followed with an underscore, followed by the year, followed by a small letter representing the month, then the three letter month, then the date. As you can see, "a" is for January, "b" is for February, and so on. "Windows Explorer" will list them in order.

NameOfFriendlyCloud_2012kNov15_FileName    (this can be the name of a folder)
    NameOfFriendlyCloud_2012kNov23_FileName    (this can be the name of a folder)

NameOfFriendlyCloud_2012lDec01_FileName (this can be the name of a folder)

NameOfFriendlyCloud_2013aJan12_FileName (this can be the name of a folder)

If a person has more than one Friendly Cloud on their computer, listing them this way will be easy to sort. Of course, each Friendly Cloud can also have its own folder and sub folders with year and month.

Using the connectors for a flash drive, USB, on the IEP card would be a good way to store many items of data for the Friendly Clouds. Of course the connector for the Storage Device on the IEP card would accommodate much larger projects. Removal of a USB or Storage Device on the IEP card should only be done when the main computer is on and through a software program that acknowledges when removal can be done.

With the IEP card holding and serving WEB pages, there will still be a need for a Server Company. When a person usually had memory space at a Server Company it was more like ten Gigabytes or more. Now with just short descriptions needed and no pictures or video that memory space can easily be reduced to fifty Megabytes. That is a reduction of 200 to 1. There will be a dramatic cost reduction at the Server Company, but probably not by that ratio. When a person considers the memory space might be fifty Megabytes even that would be too much. However, later in this patent there will be discussion about the Server Company and more items to be saved for the client.

With the WEB pages residing and being serviced from the IEP card, the Server Company will be playing some new roles in the Internet world. This will mean that the Server Company will be communicating with the IEP card and not necessarily include the owner/operator. One such example would be IP Addresses. The Server Company should always be compiling a list of malicious IP addresses or adult sites to be downloaded to its clients or the IEP card to be used for filtering. There will also be advertising, wanted advertising that is. This will be discussed later. Needless to say, the Server Companies IP address with password/s should be kept on both the main computers Storage Device and also in memory on the IEP card.

When the main computer is both powering up and powering down, it should inform the IEP card of that action. The IEP card should not be sending data to the main computer during that process. When the main computer is first turned on, during the boot-up process and before clearing the flip-flop in FIG. 7, 701 the Operating System should always look at the status of the IEP card. If the IEP card is not loaded, the Operating System should load the IEP card with its own tailored Operating System. It should also load other information such as WEB pages, passwords and their ownership, and IP addresses. There should be a good and bad list of IP addresses and passwords. If the IEP card is functioning, that is already loaded, the main computer Operating System should do CRC-R checks on the Operating System of the IEP card, and also WEB pages. Needless to say, if the IEP card Operating System is busy servicing a request, that function should be delayed for a brief amount of time.

With the co-operation of the Server Company, advertising will be able to be controlled. If the owner/operator has a list of good and bad IP Addresses, then the only thing that the owner/operator has to do is make a decision as to what to do with unknown IP Addresses. The owner/operator can decide, with the aid of a software program, if the unknown IP Addresses should all be deleted or let them come through to the main computer. If the owner/operator lets the unknown IP Addresses come through, the software can signal the owner/operator that this is an unknown IP Address. The owner/operator can then decide if the IP Address should be on the good or bad list. The owner/operator can also add the IP Address to neither list and allow it to come through again. When the computer is in a home, there can be more than one list of good and bad IP Addresses. They can be split up between family members or friends and password protected so that only the person designated can read them or be affected. An additional thing that the advertising should have is assistance from the Server Company. There are times when people may want no advertising, and yet other times when they do want advertising. The Server Company should have a list of categories for selection by a client (a list will follow). As an example, a client may be looking for a new or used car. They should be able to select the car category at the Server Company and fill out information about what they are looking for. The Server Company should take this information and assign a special password/s. This special password/s should be sent back to the client who filled out the list. At the same time the Server Company should look at its client list of businesses and determine which business clients fit the information that was filled out. For the business clients that fit the required information they also will be given the same special password/s. Now when an IP Address comes into the main computer or IEP card that might have been rejected, with the special password/s it will not be rejected. When the person finds a car that satisfies their wants they can delete the password/s from their list. The IEP card upon receiving the deleted password/s will automatically send that deletion to the Server Company and they will in turn notify the business clients that they sent it to, that it has been deleted. This will stop the advertising from coming through and hopefully stop the companies who were sending the car information from sending useless E-mails that would again get deleted.

The software and/or the firmware for the IEP card should be copyrighted. This patent does not cover that; I have enough to do.

Servers and WEB Sites

The new Server Company can drastically change from what is now a standard Server Company. The most obvious thing is that the memory of the Storage Device, which is needed for a client, will shrink. As the example in the IEP card stated, 50 Megabytes would do in most cases. And that includes enough memory for personal items and for more than one person. Needless to say, even the new Server Company can still retain the standard type of WEB pages that are currently in use. With the new Server Company, there will be two way communications from and to the client's IEP card, and more than likely with passwords. If the client has an IEP card with the WEB pages installed on it, their IP Address, optionally with a password(s), should be listed for a requesting IP Address to read. If the IEP card being requested does not have a twenty-four seven response, the hours of operation should be listed with the time zone at the New Server Company. Also the main country or countries of operation should be listed along with targeted states or cities. Which language is used on the WEB pages would also be a courtesy statement and if there is audio supporting the WEB page for visually impaired. Each client that has a WEB site, either on the new Server Company or an IEP card, should have a listing for the content of the WEB site. This could be for business, general, adult, government, educational and so on.

The potential for this new type of Server Company I believe is overwhelming. Besides having a higher ratio return on the dollar, it can and should expand into many different categories. When I mention higher ratio return on the dollar, I currently pay about $100 per year for 10 Gigabytes of memory space at my Server Company. With a charge of $10 per year for 50 Megabytes, that is an improvement. (50 Megabytes into 10 Gigabytes is 200—or about $0.50 per year with the same ratio—quite an improvement if the charge is $10 per year—20:1 increase).

And that is actually a small portion as to what should attract people to the new Server Company. Below are some items that probably should have downloadable fill-in sheets that would later be sent to the new Server Company. I have listed below some items of interest, and will try to expand on them:

Servers and WEB Sites—Advertising

Most people do want advertising. The only thing is that they do not want it all of the time. The new Server Company will be able to offer selective advertising. When a person or business purchases memory space from the new Server Company, there should be a box to check as to whether or not they are a business. If they are a business, they should be able to select at least one category from a list of fields. This list of fields will also be offered to all clients of the new Server Company for wanted or selective advertising. It can be accessed when a person goes to the new Server Company WEB site. The wanted or selective advertising itself can fall into different categories. Some clients will want advertising on the spur of the moment. Some may want it all of the time. Some may want advertising at selected times of the year such as anniversaries, birthdays, holidays. Here is a list of categories that should be offered:

A. Academies, accounting, acne remedies, actor—actress, acupressure treatment, adhesives, advertising, advise, agriculture, air conditioning, aircraft, alcohol, aluminum, ammunition, amusement parks, anatomy, ancestry, anemometers, angling, animation, Antarctica, antibiotics, apartments, archaeology, archery, architecture, armed forces, art—artists, asphalt, astrology, astronautics, astronomy, astrophysics, attorneys, auctions, authors, automotive items, autopsies, aviation B. Baby clothing—items, baby sitters, backgammon, bail bonds, balconies, balls, balsa—balsam—bamboo, bands, band saws, banks—bankruptcy, bars, barbershops, barn dances, bath and body, batteries, beauty pageants, beds—items, bees—items, bells, bicycles, billboards, billiards, biochemistry, bleachers, blood bank, boardinghouse, boats, bobsleds, bonds, bookkeeping, books, boots, botany, bow & arrow, bowling, Boy Scouts, bracelets, breweries, bridal items, brief case, broilers, buffets, bulldozers, burglar alarms and supplies, business services & colleges, butchers C. Cabins, cabinetry, cafes, calculators, calendars, calligraphy, cameras, camping, cancer, candles, candy, canes, canoes, canopies, car services & sales, cards—greeting & playing, carpentry, carpets & cleaning, cars, carts, cartoonists, cash registers, castles, catacombs, caves, cemeteries & services, ceramics, chairs, chandeliers, chauffeurs, cheeses, chemical elements, chemistry, child care & items, chiropractors, Christmas supplies, circuses, cities, cleaning, climatologist, clinics, clocks, clothing, clothing cleaners, clowns, coaches, coal, coffee & tea, coins, colleges, composers, computers, concerts, condiments, confections, construction, contour maps, conveyors, cooking, copper, copyright, coroner, costume jewelry, costumes, CPA, country clubs, coupons, cowboy—cowgirl, crafts, creamery, credit cards—unions, cremation services, crossword puzzles, curtains D. Dams, dehumidifiers, Democratic Party, demolition services, dentist services & items, department stores, depots, dermatologists, detective services, developers, diabetes items, dialysis items, diamonds, diesel items, dieticians, dining, diphtheria, diplomats, dirigibles, directions, disability items, dishes, disinfectants, disk drives, displays, distances, district attorney's, diving items, divorce data, docks, doctors, dogs, dolls, donations, donut/doughnut shops & equipment, doors, dormitories, Douglass fir, drive ways, dude ranches, dump trucks, dyes E. Ear piercing, earth moving, eating, economist, editors, electrical engineering, electronic test equipment, electronic items, elementary schools, elevator sales & repair, embroiderer, energy drinks, engraving, entertainment, epilepsy, escalators, estate sales, eye glasses F. Fairs, farm items, fast foods, FBI, fellowships, ferryboats, festivals, FHA, fiberglass, figure skating, fine arts, fire extinguishers, fireworks, fishing supplies, fire departments, flags & items, flood control, flowers, flooring, food, formal wear, four wheelers, fraternities & sororities, fuel, funeral homes, furnaces, furniture G. Galaxies, games, game wardens, garage sales/services & items, garbage services, gardening, gas stations, gears, genealogy, geology, geophysics, geriatrics, Girl Scouts, gluten free, golf, gondolas, GOP, GPS, grain elevators, gravel pits, greenhouses, guide services, guitars, gymnastics, gyms, GLxx (Gay Lesbian)

H. Haircuts/stylists, Halloween supplies, handyman, Hanukkah supplies, harbors, hardware stores, hasps, hats, hatcheries, hearing aids, heating & cooling, health foods, hearing aids, help (needed—volunteered), hematology, Hodgkin's disease, home furnishings, honeybees, hooked rugs, horoscopes, hors d'oeuvres, horses, hospitals, hospital supplies & services, hot air balloons, housekeeper, hummingbird items, hunting supplies, hurricane information, hydraulics, hydrodynamics, hygienist, hypnosis I. Ice cream, insurance, iron railings J. Janitorial, Jehovah's Witnesses, jewelry, journalist K. Kayak, kennels, keys, kitchen items, kites, knifes L. Label making, labor unions, lamps, lasers, lathes, lawn supplies & maintenance, lawyers, legislators, lighthouses, lightning items, lingerie, linoleum, literature, lithography, livestock, limousine services, lobbyist, locksmith, lodges, looms, lottery, luaus, lubricants, lumber items and services, lung specialists, M. Machinery & shops, magazines, magicians, mail service & items, malls—shopping, management services, manufacturing, maps, marriage counselor, masons, massage therapists, maternity, measuring equipment, mechanical engineering, mechanics, medalists, mediator, medical, meteorology, midwifes, ministry, mirrors, model agencies, model trains & planes, monorails, monuments, mortuary, motels, motorcycles, mountain excursions, movie theaters, moving services, mower services, museums, musical instruments & halls, mythology N. NAACP, National Guard, national parks—USA, NATO, natural gas services, nail make-up, needle point, neurology-neuropathy, nets, network systems, news items, nonprofit groups, nurseries, nursing, nutrition, nuts O. Observatories, obstetricians, occupational therapy, oceanography, oil items, Olympic, operas, ophthalmologist, orchestras, ordnance, orphanages, osteology, otology, outboard motors, outpatient care, overweight clinics, ovens P. Pacemakers, packaging, pain treatment, paint supplies, paleontology, pancakes, paint supplies, paper, parachutes, parades, parks, pawnbroker, pawnshops, peat moss, pediatricians, perfume, Persian rugs, pets, pharmacies, photography, pipes, planetariums, planned parenthood, plastic surgery, play ground items, plumbing, pneumatics, podiatry, poetry, poles—North—South, police departments, political science, ports, portraits, post offices, pottery, president, printers, print shops, prisons, proctologist, programmers, propane, psychology, publishers, pumps, puppeteer, purses Q. Quartz, quilts R. Radar ranges, radio stations, railroads, real estate, realtors, recipes, recondition items, Red Cross, refrigerator sales & repair, rehabilitation, religions, remote control, repairman, reporters, Republican Party, research facilities, reservoirs, resorts, restaurants, restoration, resume, retirement services, reunions, rifle ranges, rings, road equipment & repair, rodeo's, roofing supplies & repair, rooming houses, roommate S. Saddles, safe houses, sandblasting, sanitariums, sawmills, scaffolds, scales, schools, scrap booking, sculpture, seamstress, seeds, senior living, septic systems, sewing machine & supplies, sheds, sheet metal, shoes, shred, shrubbery, shutters, siding, signs, silver, silverware, skates, skiing supplies, skylights, smokehouse, smorgasbords, snowplow items & services, sociology, software, solar panels, snow mobiles, snow removal, sororities & fraternities, soundproofing, souvenirs, special delivery, speech therapist, spices, sports tickets—games, sportswear, springs, sprockets, spurs, square dance, stadiums, states, steel mills & workers, stencils, stockbroker & exchange, storage centers, sub-sandwiches, subscriptions, suicide prevention, surfboards, surgeons, surveying services & equipment, swim suits, swings, symphonies T. Tables, taco, tailors, tanning, tattoos, taverns, taxicabs, tea & coffee, telephones, telescopes, tennis, tick prevention, tile—bath—kitchen, tires, tools, tractors, training manuals, travel, trucking, tutors, tuxedo U. Undergarments—ladies & men, undertakers, uniforms, universities, upholstery, US Air Force, US Coast Guard, US Marines V. Vacations, vaccinations, vacuums, valves, vegetables, vending machines, ventilators, vertigo, veterinarians, vice-president, video games, vitamins, vocational schools, volleyball, voter registration & items, voyages W. Walkie-talkie, wall candy, wall paper, washers & dryers, water coolers, water towers, wedding items, well repair & drilling, wheel chairs, wills, wind mills, windows, winter clothing, wood, wood engraving, wood working, World Court, wrought iron X. Xerography, Xerox, x-ray, xylophone Y. Yachts, yarn, yearbooks, YMCA—YWCA, yoga classes, yo-yo's Z. Zip codes, zoo's, zoology In addition to the above list, there should be a list for store names. There are many people who would like to receive all of the advertisement from certain stores. This can range from clothing, to dining, to vacations, to entertainment and much more. When a business joins the new Server Company, they should also fill out if they want their name and type of business added to the list if business. That should also include where they are located. For some businesses their location does not matter, others it does matter. When a location is noted, the address and zip code and also a phone number/s should be listed. With the above list, there should in most cases be subcategories for each major category. I will not list those. If I did try to, this could turn into a thousand pages. As in the above mentioned part under the IEP card, the new Server Company will capture the IP Address of the client requesting wanted advertising. The new Server Company will create a unique password(s) for the IP Address. The new Server Company will send that unique password(s) back to the client's IEP card and the IEP card will forward it also to the main computer. The new Server Company will then scan a list of businesses that match the wanted criteria. To those businesses, it will give the requesting clients IP Address, the unique password(s), and what the client was requesting from their fill out sheet. When the client cancels the password(s), the new Server Company will forward that to the businesses it had given it to. That should terminate the advertising. There can be a charge for this service, and it can be very reasonable.

Servers and WEB Sites—Professional Biography

This category has mostly to do with seeking work or employment. The companies on the New Server Company can have a wanted personal list. That would include what type of job, experience wanted, possibly the pay and benefits. It should also list the job location and possibly a phone number and/or E-mail address. Clients looking for employment could pull up the list and scan for jobs fitting their skills. This can be part of a client's 50 Megabytes.

Servers and WEB Sites—Ancestry

This category has to do with the family tree. The curious client can pull up a WEB page from the New Server Company and look for or try to trace a family name or names. There could also be a place to list a name or names looking for family members. Phone numbers and/or E-mail addresses can also be listed for return contact. This can be part of a client's 50 Megabytes.

Servers and WEB Sites—Personal Biography

This category has to do with social events. This category actually has a wide span. It can range from dating, to card playing, to dancing, to sport activities, to much more. It can also include just socializing for kids from the same school, to anywhere in the world, to an age group, to the type of music they like, to much more. There are many more categories that can be included under this heading. This could also mean the bibliography of a company. There can be pictures just like the WEB pages because it would reside on the IEP card. Other search engines may not be able to view this information in this category and possible other categories. There can be a special header that identifies this or other categories as not accessible to outside spider. This can be part of a client's 50 Megabytes.

Servers and WEB Sites—Dear Abby (Can You Answer My Question?)

This category has to do with a client asking questions for help. Again, this category actually has a wide span. It can cover from psychiatrists, to doctors, to cars, to food and much more. There should be a category list of services. This can be part of a client's 50 Megabytes.

Servers and WEB Sites—Sell it, Buy it or Bid on it

This category can be like a garage sale to a large department store. Portions of it are like the wanted advertising but you do not need the special password/s. The category list can be very similar to the wanted advertising list. The advantage is that the small person can list or buy. The only thing that should be listed is an address, zip code, E-mail, or phone number. Not all of those items have to be listed. There should be limitations as to how long it will be listed, how many pictures and how many characters for wording. A price could be charged. This can also include things that are bid upon. This can be part of a client's 50 Megabytes or a small charge.

In many ways the Server Company can also be like a Search Engine, which will broaden its base of clients. By providing more and more services, the Server Company will constantly expand its client list.

As mentioned under the IEP card, the New Server Company should try to help doing some of the services that the search engines do. This will greatly speed up their tasks. Besides being specific for one search engine company, the New Server Company can also offer a "general search" that many or all search engine companies might embrace. With each WEB page, there would be a time and date stamp referring to the latest update. And again, by working with the clients who have IEP cards, this task time can even be reduced for the Server Company.

An additional item the New Server Company should have is on-line classes for use or designing WEB pages. Some clients may be able to take example WEB pages and modify them for their own use. Other clients may want to read and create their own WEB pages from scratch. There should also be help in installing an IEP card. This can include software that can be downloaded to the client to be installed on the main computer and later copied to the IEP card.

Servers and WEB Sites—Personal Items

Some personal items can be very personal, as an example, health. To help the medical community, your Server Company could provide a fill-in-list that asked questions about age, gender, where you live, heart disease, blood pressure, if you had a stroke, and so on. There would also be an option not to list your name or not to contact you. Another words remain totally anonymous. However, the information collected could help the medical industry. And that is good. Some of the questions could ask for volunteers, which could send data back to you through the Server Company, so that you can make a decision as to whether or not to participate. I myself do volunteer in some medical studies.

There can be categories that are headlined with occupation, financial, business, religion, wills, clubs, social gatherings, ancestry, chat rooms, job search, job opening, just to name a few. The Server Company can be a social hub for almost anything. And there easily could be enough room for the whole family, yes kids too.

In the "Personal Items" section, and possibly others, the data should possibly be encrypted. This encryption should be stored in an area that is protected from any spiders. The algorithm should change from one client to another. An option to encryption would be to split the 50 Megabytes into two different memory banks. One bank would consist of data that can be searched by Spiders for search engines from other companies. The other bank would only be accessible from or by the Server Company.

Advanced Password Protection

Figure 8:
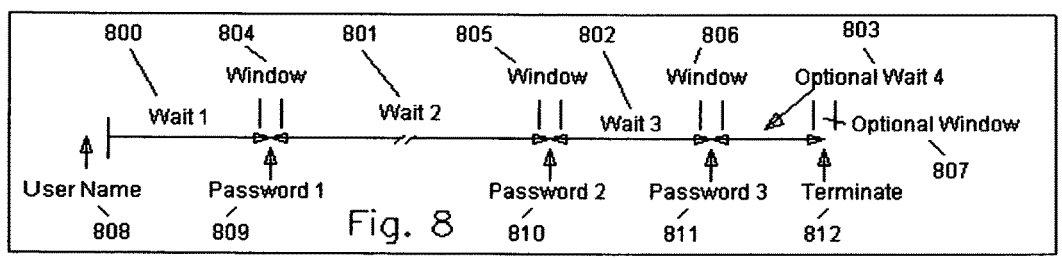
FIG. 8 shows one wait period sequence for the use of multiple passwords.
Figure 9:
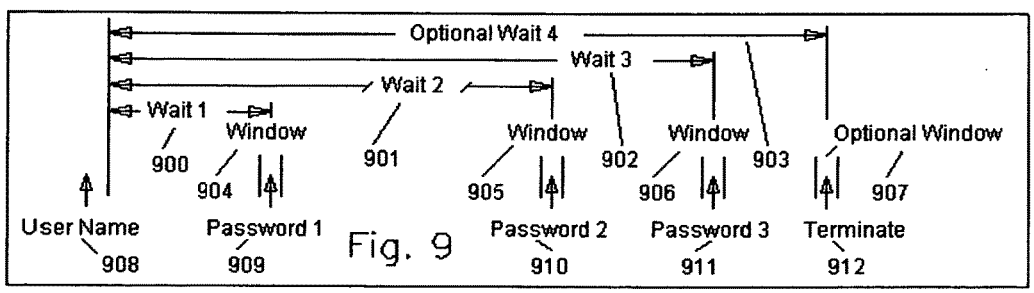
FIG. 9 shows another wait period sequence for the use of multiple passwords.

Please view FIGS. 8 and 9. Most people who have a computer hooked to the Internet have at least one connection that asks for a password to gain access to their account. Usually a box will open up that asks for the User Name, and a password, and contain a submit button. To add complexity to this, one or more passwords 809, to 812, also 909, to 912 will be added and a controlled wait period 800, to 803, also 900, to 903 between items. The controlled wait period will have a short time period before and after that the data can appear, hence a window 804, to 807, also 904, to 907. With the time period before and after, that will open up a time slot that the data can only appear in. Anything outside of this time slot will not be accepted. Hence, the wait times and windows is critical. As an example, the new password would look something like this:

User Name; wait1 800 or 900; password1 809 or 909; wait2 801 or 901; password2 810 or 910; wait3 802 or 902; password3 811 or 911; wait4 803 or 903; terminate. The time period before is 400 milliseconds, the time period after is 600 milliseconds. In the example the wait1 time is 11.4 seconds, the wait2 time is 68.2 seconds, the wait3 time is 3.3 seconds. The wait4 time could be optional. Again, any data outside of the allocated window is rejected. A simple software program can produce the desired sequence with accurate times using the computer timer. At the receiving computer, your complex algorithm would be read by the computer and matched for correct passwords and time slots that are part of your password held by the receiving computer. In the above example, a person trying to hack into the account could have the User Name, all of the passwords, and all but one wait time correct and still not gain access to the account.

Because the window box that opens up only asks for the User Name and a single Password, anybody, or software program, trying to gain entry to your account will not know how many passwords or the critical wait periods that accompany them.

The owner of the computer more than likely will have more than one account that requires a password, or passwords. The User Name, Passwords, wait times, and before and after time slots, with an associated name for the account can be stored in a protected zone such as the boot-up zone. There can also be an algorithm that is stored there for changing one or more passwords or parts of a password. The same can be true for the wait periods. During the boot-up processes, the operating system can read all of the different algorithms for accounts and place them in the operating system ram zone. With the click of an icon, the owner or operator of the computer system can make a selection. If need be, the click of the icon can also ask for entry, such as a password or thumb print, into the selection menu. The operating system could also offer a window where the owner or operator would fill in blanks for the User Name, a wait length, a password, another wait length, and so on to accommodate the needed passwords and wait times. There would also be the before and after time slots to fill in. If that choice were given to me with my poor memory, I would have to have everything written down on a piece of paper!

This more complex password scheme as described here does not have to be confined to just computers. It can also be implemented in cell phones, external memory, cards used in door entry systems to name a few. One point of caution, if the device is crystal based, the before and after time slots can be tight. However, if the device has an oscillator that is made up of a resistor and capacitor, then the before and after time slots should be of a larger amount. This larger amount for the time slots has to accommodate wide temperature extremes that could cause the oscillator time to very dramatically. Another thing that can effect the before and after time slots is the speed of the Internet connect lines, both the transmitting computer and the receiving computer. Landlines are still in existence, but fortunately higher speed interfaces, such as optical, are becoming more and more common.

Each item that comes into the receiving computer should have a terminator with it. As an example, the IP address should have a terminator 812 and 912. The URL should have a terminator. The User Name and all of the passwords with the wait times should be considered as a single item with a terminator.

There should be a notification proceeding the User Name that this is a complex password. Both the transmitting and receiving computers should disable all interrupts in their respective processors during this process. However, if the communication is between IEP cards, the main processor on the computers need not have the interrupts disabled. All of the wait times could start with the reception of the User Name or they could cascade after each item is received. See FIGS. 8 and 9. With the notification proceeding the User Name that this is a complex password there can be an indicator's for the algorithm that would alter a password or wait time.

There should be a generic program for this complex password scheme on both the transmitting and receiving computers. This generic program would be used to determine window accuracy. The generic program would first send some wait times, and the before and after time slots for the test run to the receiving computer. The wait times that would be sent in the generic program need not be the actual time used in the real complex password. Additionally, the passwords used need not be the actual passwords used by the sending computer. When the receiving computer receives this generic program, it should send back a pass or fail, and the clearance times, both before and after, for each of the wait period windows. This program is only used to calibrate the timing between the computers for setting up an account. A hacker would gain nothing from this program about a client's complex password. This program could be used by more than one client for timing analysis.

User Name; wait1; Test1; wait2; Test2; wait3; Test3; wait4; terminate.

In my opinion, the Server Company being used, and Friendly Clouds, just to name a couple, should implement this more complex password scheme. If this were implemented on a system that had the Internet electronics installed on the computer, the main processor would not have to disable its interrupts. An assumption is made here that the Internet electronics has its own processor just for the transmitting and receiving of Internet information.

New Software for Manufactures and Distributors

I am not attempting to write any software here in this patent. As anybody who has known me, I have written my share, and would actually enjoy writing all of the software needed for this patent. However, I know I would not live long enough to do it! Besides that, by bucket list is still full! I have listed some categories for new software.

Zone control for the Storage Device Electronics, operating system, also electronic design changes Zone control for the microprocessor RAM, Operating System, also electronic design changes IEP card electronics, operating system, also card design Friendly clouds for the IEP card and main computer Wanted advertising and responding advertising Social or personal items to be put at the New Server Company Creating WEB pages for the clients of the New Server Company Better password protection Items For the Software Company These are items the Software Company should be looking at for the PPA that Ralph Hilla is proposing.

A. During the boot-up routine, display an Icon for the operator to click if they want to make changes to the boot-up Zone. If the operator does not click the Icon, it can be removed from the screen.

B. If the boot-up Icon is clicked, ask for additions to the Zone and/or removals from the Zone. Should there be a CRC-R algorithm for the addition? If there was a previous problem with the system, should the Operating System perform CRC-R checks on applications loaded on the hard drive? This question can be selected to always do CRC-R checks during boot-up—additionally; during boot-up this status can be changed. It can range from none, to selected applications, to all applications for the boot-up check.

C. The Operating System should be capable of developing randomized CRC-R routines. This can include time, date, portions of the microprocessors ID, portions of the hard drive ID, a rollover timer sense the computer was turned on.

D. During the boot-up routine, set the RAM comparator set for the Operating System residing there. This set of comparators has the AND gate identifying it as the Operating System.

E. During the boot-up routine, should the Operating System check for "free space" in none, selected, all Zones? This can be changed by the operator. The "flagged Zones" can be increased or decreased in size. Possibly these checks can be time, date stamped. A minimum size for each Zone can be set for the boot-up check routine—automatic resize.

F. On the connector between the microprocessor and the hard drive, there should be a pin added to accommodate the Operating System "AND" gate. If there isn't already, there should also be a pin that indicates when a data file is in process for uploading and downloading with the hard drive. The "header" should be locked to the "Rev" for automatic updates and changes—this could be the number of bits used for a Zone. The Zones could optionally be given names that are transferred and latched—this of course would require a larger latch—how many bytes?

G. There should a routine such as "Windows Explorer" that shows each Zone with its start and end tracks (including the three comparator set), the size of the Zone, the used and free space for each section, the size of each application, the applications loaded and/or copied. The operator should be able to resize the Zone and its sections during normal operation of the computer, not just during the boot-up routine. They should also add or remove an application—actual or copied.

H. There should be an Icon for adding an application/s to the "Copy Zone". This should also include placing the application/s into the boot-up Zone with a CRC-R. These applications can optionally be placed in the "Transfer Zone" for an automatic transfer to the boot-up Zone during power-up. The "Copy Zone" can be used by the other Zones for holding applications they might need, thus reducing redundancy. The "Transfer Zone" is used during the boot-up routine for moving applications or data to the "Boot-up Zone" which is protected from servoing or read/write after the boot-up has been completed. Both the "Copy Zone" and the "Transfer Zone" should be normally set as read only with the set of comparators. The Operating System can override this with an Icon, optionally password protected, by the operator. When a Zone uses a data file to specify applications that are residing in the "Copy Zone" that data file should NOT be accessible to any application except the Operating System—another words that data file should NOT be in normal Zones—it should be in a special protected Zone that only the Operating System or the hard drive firmware/software has access to. The computer operator, optionally with a password, should be able to modify that data file used for "Copy Zone" access—again, only through the Operating System.

I. In the event an application is downloaded—Internet or otherwise—to an existing Zone, the Operating System should ask the operator if certain files in the write section of that Zone should be copied and protected by placing them in the read section—time and date stamped. These redundant files can be removed by the operator at a later date. If listed by a program such as "Window Explorer" they should be highlighted with a different color.

J. If the above mentioned download is E-mail, and placed automatically by the system, it should be placed in the read section of the Zone by the Operating System. The write section of this Zone should be empty or close to empty. Malicious software embedded with the E-mail should do little to no damage to this Zone—if there is no data in the write section there will be no damage.

K. When the operator of the computer whishes to upload an item/s to RAM, the Operating System, or automatically, should set the comparators in RAM and place the Zone number in a latch that is attached to those comparators. The application/s in any Zone does NOT have access to the Zone number placed in any latch—at best only the Operating System.

L. When multiple Zones are placed in RAM, the Operating System can automatically resize the space for those Zones. Optionally, the Operating System should allow the computer operator to size the Zones. The Operating System can be passed, from the hard drive, past size allocations of RAM from previous uses.

M. In the event an application attempted to move out of its RAM comparators and trips the flip-flop in the microprocessor, the Operating System should read and store the memory address shift register, which application it was, its position in RAM, and the time and date. That data should be optionally sent to a "vendor" for analysis. The operator should be able to send that data immediately or at a later date. After xx amount of time, that information can be deleted by the Operating System.

N. During resizing for Zones in RAM, there should be some extra memory in the microprocessor that can be used for storage and retrieval of data. This memory is NOT part of the memory used for normal processing of data—it is only accessible by the Operating System. In the event such as the above item—"attempted to move out of its RAM comparators"—the Operating System can also use this memory space for downloading to the hard drive for storage of the malicious software information used in diagnosis. This memory could be external to the microprocessor.

O. In the event there was an—"attempted to move out of its RAM comparators"—the Operating System should flag the operator with a window describing the problem to the computer operator and options as to what to do. The Operating System should NOT try to continue operation with that application until the problem is resolved. Information on the screen should list all of the applications in that Zone and which application did the violation. Potentially, it could have been another application residing in that Zone that corrupted another application in that Zone. When the information is sent for diagnosis, all of the applications residing in that Zone should also be sent.

P. The Operating System should have the capability to do a "stress test" on new downloaded applications. This "stress test" should include running the real time clock at a faster rate yet be capable of replacing the synthesized clock rate with the accurate clock time. This may require co-operation with the manufacture of the microprocessor company. There should be a program with suggestions and operator modifications to change the process. Optionally, this program could also generate data files that should come out with known results that can be analyzed. This more than likely will have to include "phony" keystrokes.

Q. If a call is made to the Operating System to download data to the hard drive, the Operating System should be able to enable the proper latch with the Zone number and block the "AND" gate for the Operating System.

R. If a call is made to the Operating System to switch to a different Zone, the Operating System should be able to clear the flip-flop for the Zone being left and check the status of flip-flop of the Zone going to—reset if necessary.

S. For the IEP Card; when the main computer is powering up and down, the Operating System has to notify the IEP Card about the process taking place.

T. For the IEP Card; during the boot-up operation, the Operating System has to download items to the IEP Card, even if it is up and running. These could include; IP addresses friendly and not friendly, WEB pages, passwords used for advertising in process, passwords used with IP addresses, test the real time clock of the IEP Card against the computer real time clock—reset if necessary.

U. For the IEP Card; Items that may be sent back from the IEP Card would be E-mail stored, IP addresses with time and date while the computer was off, special messages from the server company, special messages from requested advertising, status of "Friendly Clouds" space, any spider activity, and the "back-up battery" power.

V. For the IEP Card; ask for status of the RAM space at the Server Company. This could include wanted advertising still active. For a business, this could be advertising requests from clients of the Server Company.

For the IEP Card; replies to social media requests—this could include things such as dating, card clubs, ancestry, activity events that include hiking, golf, camping, dining, rock climbing, dancing, and on and on.

The invention claimed is:

1. A computer system comprising:
   a microprocessor;
   a random access memory (RAM) communicatively coupled to the microprocessor;
   a first comparator associated with the random access memory that is loaded with a first random access memory location value;
   a second comparator associated with the random access memory that is loaded with a second random access memory location value, the amount of memory between the first value and the second value being greater than an amount of memory needed to store an executable instruction set for an application, the memory being linear; and
   a fault triggered in response to when the application calls for memory locations outside the bounds of linear memory between the first random access memory location value and the second random access memory location value.

2. The computer system of claim 1 wherein the computer system prevents further writing to the random access memory in response the warning being triggered.

3. The computer system of claim 1 further comprising an operating system that prevents writing of another executable code on the linear memory between the first random access memory location value and the second random access memory location.

4. The computer system of claim 1 further comprising an operating system that produces a prompt, in response to the fault, seeking an input to add additional linear random access memory next to the linear random access memory between the first random access memory location and the second random access memory location.

5. The computer system of claim 1 wherein the warning indicates that the linear random access memory between the first random access memory location and the second random access memory location is full.

6. The computer system of claim 5 wherein the warning states that further operations require a restart of the computer system.

7. The computer system of claim 1 further comprising a third comparator associated with the random access memory that carries a third random access location value, an amount of random access memory being read only between the random access memory location associated with the second comparator value and the random access memory location associated with the third comparator value.

8. The storage system of claim 1 further comprising:
   a fourth comparator associated with a fourth random access memory location value; and
   a fifth comparator associated with a fifth random access memory location value, the amount of memory between the fourth random access memory value and the fifth random access memory value being greater than an amount of memory needed to operate a second executable instruction set, the memory being linear.

9. The computer system of claim 8 wherein there is a space provided between the second random access memory location value and the fourth random access memory location value that is left unwritten.

10. The computer system of claim 9 wherein the space provided between the second random access memory location value and the fourth random access memory location is initially reserved for future expansion of either the linear ram memory for operations associated with the first executable instruction set or the linear ram memory for operations associated with the second executable instruction set.

11. The computer system of claim 9 wherein the space provided between the second random access memory location value and the fourth random access memory location is initially reserved for future expansion of either the linear ram memory for operations associated with the first executable instruction set or the linear ram memory for operations associated with the second executable instruction set.

12. The computer system of claim 8 wherein the second executable instruction set is the only instruction set allowed to use the linear ram between the fourth random access memory value and the fifth random access memory value.

13. The computer system of claim 8 wherein the second executable instruction set is the only instruction set allowed to use the linear ram between the fourth random access memory value and the fifth random access memory value, and wherein the first executable instruction set is the only instruction set allowed to use the linear ram between the first random access memory value and the second random access memory value.

14. A computer system comprising:
   a microprocessor;
   a random access memory communicatively coupled to the microprocessor;
   a first comparator associated with the random access memory loaded with a first random access memory location value;
   a second comparator associated with the random access memory loaded with a second random access memory location value, the amount of memory between the first value and the second value being greater than an amount of memory needed to store an executable instruction set for a single program, the memory being linear; and
   a latch which is triggered in response to an amount of executable instruction set is greater than the amount of linear memory between the first value of the comparator and the second value of the comparator, the latch, when triggered, produces a fault.

15. The computer system of claim 14 wherein the fault includes a message on a computer screen.

* * * * *